(12) United States Patent
Storek et al.

(10) Patent No.: US 9,320,388 B2
(45) Date of Patent: Apr. 26, 2016

(54) LIQUID MOVEMENT AND CONTROL WITHIN A CONTAINER FOR FOOD PREPARATION

(75) Inventors: David Storek, Gothenburg (SE); Robert P. Otillar, Los Altos, CA (US); Antonia L. Sequeira, Los Altos, CA (US)

(73) Assignee: LEGUPRO AB, Gothenburg (SE)

( * ) Notice: Subject to any disclaimer, the term of this patent is extended or adjusted under 35 U.S.C. 154(b) by 439 days.

(21) Appl. No.: 12/945,891

(22) Filed: Nov. 15, 2010

(65) Prior Publication Data
US 2011/0117259 A1   May 19, 2011

Related U.S. Application Data

(60) Provisional application No. 61/261,342, filed on Nov. 15, 2009.

(51) Int. Cl.
| | |
|---|---|
| A47J 27/18 | (2006.01) |
| A47J 27/16 | (2006.01) |
| A47J 36/14 | (2006.01) |
| A23L 1/01 | (2006.01) |

(52) U.S. Cl.
CPC .............. *A47J 36/14* (2013.01); *A23L 1/0128* (2013.01)

(58) Field of Classification Search
CPC ....... A23B 7/06; A23B 4/0053; A23L 1/0121
USPC .................. 426/509; 99/330, 407; 219/447.1, 219/448.13
See application file for complete search history.

(56) References Cited

U.S. PATENT DOCUMENTS

| | | | |
|---|---|---|---|
| 4,144,671 A | 3/1979 | Lee | |
| 4,376,127 A | 3/1983 | Lunde | |
| 5,313,876 A | 5/1994 | Hilger et al. | |
| 5,546,849 A | 8/1996 | Shefet | |
| 5,941,165 A | 8/1999 | Butte | |
| 6,389,958 B1 * | 5/2002 | Ono ................................. | 99/330 |
| 6,851,351 B2 | 2/2005 | Payen et al. | |
| 2004/0238555 A1 | 12/2004 | Parks | |

FOREIGN PATENT DOCUMENTS

| | | |
|---|---|---|
| JP | 2004-210017 | 7/1992 |
| WO | WO 2008/084941 | 7/2008 |

OTHER PUBLICATIONS

PCT International Search Report and Written Opinion for PCT/US2010/056636, Jul. 12, 2011, 11 Pages.

* cited by examiner

*Primary Examiner* — Tu B Hoang
*Assistant Examiner* — Thomas Ward
(74) *Attorney, Agent, or Firm* — Fenwick & West LLP

(57) ABSTRACT

An apparatus and method for controlling the movement of liquids into and out of a container is described. The apparatus includes a main container for holding the food product, a liquid inlet for providing liquid into the main container with the food product, and a liquid outlet for removing liquid from the main container without removing the food product. The apparatus can include a valve attached to the liquid inlet and a valve attached to the liquid outlet for automated regulation of inflow and outflow of the liquid from the main container. The apparatus also includes a heater associated with the main container for automated heating of the main container including the food/liquid, and a controller for automatically regulating the inflow/outflow of the liquid from the main container. The apparatus can be designed as a cleanable, portable, fully automated appliance for sprouting, rinsing, soaking, cooking, etc. food products.

19 Claims, 11 Drawing Sheets

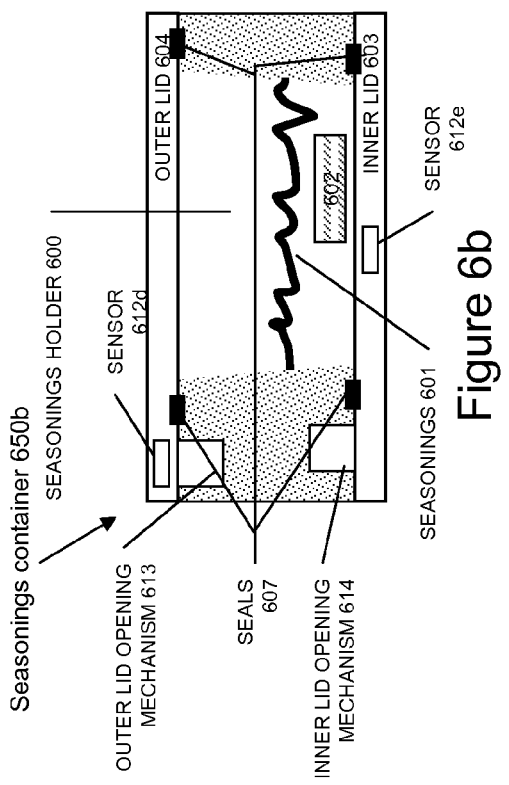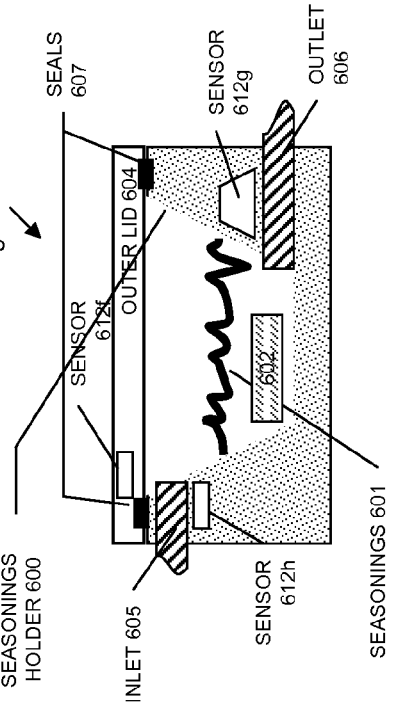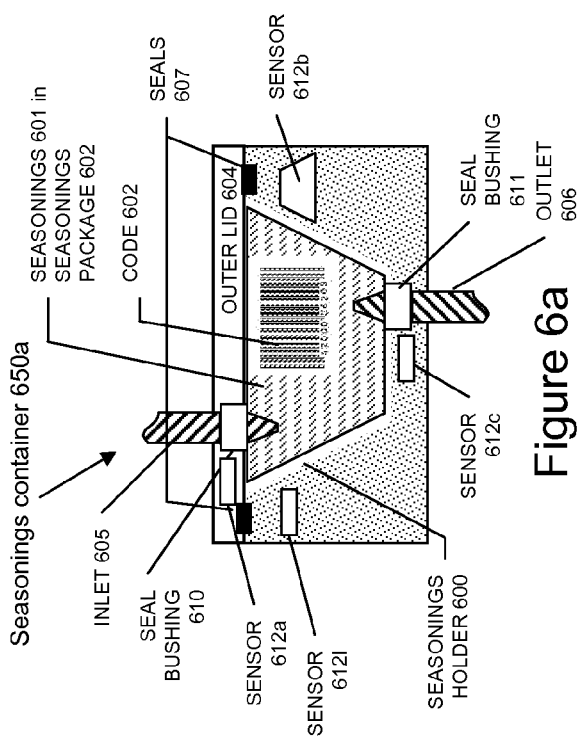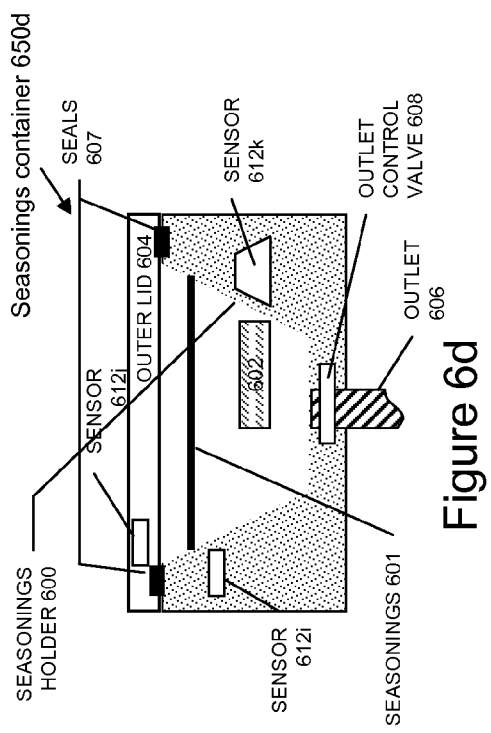

** LIQUID MOVEMENT AND CONTROL WITHIN A CONTAINER FOR FOOD PREPARATION

RELATED APPLICATIONS

This application claims the benefit of U.S. Patent Provisional Application No. 61/261,342, entitled "Liquid Movement and Control within a Container for Food Preparation," filed Nov. 15, 2009, which is incorporated herein by reference for all purposes.

BACKGROUND

1. Field of the Invention

This invention pertains in general to a container for controlling movement of liquids, and more specifically to an apparatus for preparing and cooking food products.

2. Description of the Related Art

While there are a variety of home kitchen appliances currently sold for cooking different food items, there are some unmet needs that have long been a problem in the household food-preparation/cooking world. For example, preparing and cooking dry beans is a notoriously laborious process, though cooked dry beans are well-known to be healthier and better tasting than canned or preserved beans. Further, in contrast to canned beans, the cook can control the content of the meal when cooking dry beans, including managing salt and sugar levels, and eliminating chemicals used in processing or preserving canned or processed beans. Dry beans can also typically be purchased for a low price. To get the better health benefits, taste, dietary control, and price of the dry beans, however, the cook must undergo many steps, each requiring the cook's presence.

The overall process for bean preparation/cooking can require hours, if not days (e.g., soybeans may require soaking for more than 12 hours). (See, e.g., M. Katzen, The New Enchanted Broccoli Forest, 2004. pp. 276-278; incorporated herein by reference for all purposes) Dry, unprocessed beans must often first be rinsed or washed to remove debris, and then the beans are soaked or otherwise hydrated with liquid, which can shorten cooking time and make the beans more digestible (e.g., 4 to 8 hours or overnight for a normal soak; 1 hour or more for a quick soak). While beans can be cooked in the soaking water to maximize nutrients, many drain the soaking water, rinse the beans, and then cook in fresh water, which is known to improve the digestibility and reduce flatulence associated with beans. Finally, the cooking can begin, commonly in a pot on the stove, beginning with boiling of the beans (including skimming foam collecting on top) and then simmering of the beans until cooked and tender (e.g., 1 to 2 hours). Since salt can disrupt the cooking, salt typically is not added while soaking or during the first hour of cooking. Thus, multiple labor-intensive steps require the user to return to the kitchen and take action, all the while carefully managing the temperature and environment of the beans.

Bean sprouting has also become a popular first step in the bean cooking process since sprouting increases the health benefit. (See, e.g., Ann Wigmore, The Sprouting Book: How to Grow and Use Sprouts to Maximize Your Health and Vitality, 1986; Steve Myerowitz, Sprouts The Miracle Food: The Complete Guide to Sprouting, 1998; and M. Braunstein, Sprout Garden, 1999; these references are incorporated herein by reference for all purposes). To sprout dry beans, the cook rinses the dry beans, lays the beans out in a container with enough water to keep them moist, regularly adds water (e.g., typically twice a day), carefully monitors the water level to avoid drying out or over soaking of the beans. Typically, the beans sit for 3 or 4 days during sprouting (though they can mold or rot if they are allowed to sit for too long) and the temperature and lighting conditions of the sprouting beans must be monitored. Thus, the sprouting process adds days of effort and numerous manual steps for the cook to perform, which can push the sprouting process out of reach for the typical active or working household.

Currently, there is no device that can perform all or even most of these sprouting/preparation/cooking steps in an automated fashion. Automated devices such as crock pots and rice cookers do not have the functionality to perform these steps, since they do not even have the ability to move water into and out of the devices, much less the ability to carefully manage environmental conditions over a lengthy cooking process, and allow the performance of multiple different food preparation/cooking steps. While there are a few commercial cookers used by restaurants for cooking beans in large quantities, none of these devices are helpful to the typical consumer in the average household who wishes to prepare a meal including beans that started as dry, unprocessed beans (e.g. they are too large, too heavy, to complicated and labor-intensive, not suitable for home use, not portable or easily cleanable with standard home washing equipment, etc.). Thus, there is a long-felt and unmet need for a container for controlled movement of liquid, which can be used by the average consumer to fully automate preparation and cooking of many "food products" (i.e. something that can and is intended to be consumed after cooking, such as dry, unprocessed beans).

SUMMARY OF THE INVENTION

The above and other needs are met by an apparatus and method for moving a liquid to and from a main container that can be used for cooking food products. The apparatus combines the processes of hydration and cooking of food products into one compact main container. It can include one or more valves to regulate the inlet of liquid into the main container from a liquid source. It can also contain a liquid opening and valve in the main container to regulate the flow of liquid out from the main container. The liquid source may originate in a separate container for liquid attached to the main container and the liquid drain may terminate in a third separate container for liquid attached to the main container. Both valves may be automated and electronically controllable to make the invention a fully automated soaker and cooker for beans, legumes, rice, grains and cereals and other food products.

In one aspect, the apparatus is a portable apparatus for preparing and cooking a food product. The apparatus comprises a main container for holding the food product, a liquid inlet opening into the main container for controllably providing liquid into the main container with the food product, and an inlet valve connected to the liquid inlet for automated regulation of inflow of the liquid into the main container. The apparatus also comprises a liquid outlet opening from the main container for controllably removing liquid from the main container without removing the food product, an outlet valve connected to the liquid outlet for automated regulation of outflow of the liquid from the main container, and a heater associated with the main container for automated heating of the food product and the liquid in the main container. Additionally, the apparatus comprises a controller in communication with the main container for automatically regulating the inflow of liquid into the main container, the outflow of the liquid from the main container, and the heating of the food product and the liquid by the heater.

The portable apparatus can further comprise various other components and features. In some embodiments, it is an apparatus for sprouting the food product that further comprises a grow light attached to the main container for providing light to the food product inside the main container, an air circulator associated with the main container for circulating air inside the main container, an agitator associated with the main container for circulating the food product or the liquid in the main container, and the controller for controlling inflow and outflow of liquid into the main container for maintaining moisture in the main container to sprout the food product. In some embodiments, the portable apparatus further comprises a grow light attached to the main container for providing light to the food product inside the main container, wherein the controller is further configured to control the grow light for sprouting of the food product, and is further configured to control delivery and removal of liquid from the main container for sprouting. In some embodiments, the controller is further configured to run one or more cycles selected from a group consisting of: a sprouting cycle for sprouting of the food product, a rinsing cycle for rinsing of the food product, a soaking cycle for soaking of the food product, and a cleaning cycle for self-cleaning of the apparatus.

In some embodiments, the portable apparatus further comprises a computer-readable storage medium storing computer instructions executable by a computer processor. In these embodiments, the computer instructions can comprise any of the following: a) a recipe that specifies one or more parameters for operating the apparatus to prepare the food product, b) a recipe that specifies a temperature of the main container by providing the instructions to the controller, wherein the controller is further configured for applying the instructions to determine a desired temperature of the main container and for controlling the heater to heat the main container to a specified temperature, or c) a recipe that specifies a timing for delivering and removing liquid to the main container, and specified one or more levels of the liquid in the main container during food preparation. In some embodiments, the portable apparatus further comprises a display unit including a user interface with which a user can interact with the apparatus. In some embodiments, the portable apparatus further comprises a plurality of sensors for providing feedback to the controller regarding one of the following: a) a liquid level in the main container, the controller adjusting the liquid level in the main container based on readings from the sensors by controlling opening and closing of the inlet valve and the outlet valve to allow liquid to enter or be removed from the main container, or b) a temperature in the main container, the controller adjusting the temperature based on readings from the sensors. In some embodiments, the portable apparatus further comprises one or more sensors arranged on the apparatus to measure a plurality of parameters inside the main container. The parameters can comprise a weight, a volume, a pressure, and/or a temperature, a type of food and an eatability or cooking status of the food product in the main container.

In some embodiments, the portable apparatus further comprises an air circulator in the main container for controlled inlet of fresh air into the main container. In some embodiments, the heater further comprises one or more heat sources attached to or built into the main container having a controllable power output that functions by a means selected from a group consisting of: resistively, inductively, and by infrared control. In some embodiments, the inlet valve is connected to the liquid inlet with a tube for delivering liquid from the inlet valve to the liquid inlet, and wherein the outlet valve is connected to the liquid outlet with a tube for delivering liquid from the liquid inlet to the outlet valve. In some embodiments, the portable apparatus further comprises an outlet cover which can be one of the following: a) positioned over the liquid outlet for allowing liquid to drain out of the main container without allowing the food product to pass through the liquid outlet, or b) positioned over the liquid outlet where the outlet cover is a mesh having a plurality of openings sized to permit liquid to pass through the opening of the mesh while preventing food product from passing through the openings of the mesh. In some embodiments, the liquid outlet further comprises a side wall drain in the main container and a tube running up a side of the apparatus for using siphoning action to drain the liquid from the main container.

In some embodiments, the portable apparatus further comprises an inlet container attached to the inlet valve of the main container for containing the liquid provided to the main container through the inlet valve. In some embodiments, the portable apparatus further comprises an outlet container attached to the outlet valve of the main container for receiving and containing the liquid drained from the main container through the outlet valve. In some embodiments, the portable apparatus further comprises an inlet container for containing the liquid to be provided to the main container and an outlet container for containing the liquid drained from the main container, wherein the inlet container is connected to the inlet valve by a tube for delivering liquid from the inlet container to the inlet valve, and wherein the outlet container is connected to the outlet valve by a tube for delivering liquid from the outlet valve to the outlet container. In some embodiments, the portable apparatus further comprises an outer container and a lid surrounding the main container for providing thermal insulation to the main container, wherein one of the lid or the outer container includes a gas outlet for releasing gases formed in the main container. In some embodiments, the portable apparatus further comprises an inlet container that is one of the following: a) positioned above the main container to form a lid for the main container, the inlet container operating by gravity to provide the liquid into the main container, or b) positioned to a side of the main container, the inlet container operating by gravity to provide the liquid into the main container and being built into, attached to, or separate from the main container. In some embodiments, the portable apparatus further comprises an inlet container positioned to a side of the main container that provides the liquid to the main container via gravity, and a hose or a pipe from a remote liquid source connected to the inlet container. The hose or the pipe can comprise a water faucet. In some embodiments, the portable apparatus further comprises an outlet container for receiving liquid from the main container, the outlet container positioned below or to a side of the main container, wherein the outlet container is built into, attached to, or separate from the main container. In some embodiments, the portable apparatus further comprises a hose extending to a remote outlet container. In some embodiments, one or both of the inlet valve and the outlet valve are pumps for pumping water to and from the main container.

In some embodiments, the main container of the portable apparatus is a pressure cooker for cooking food products at a temperature above 100° C. and at an elevated pressure above atmospheric pressure. In some embodiments, the food product is one of or a mixture of food products selected from a group consisting of: beans, legumes, cereals, grains and rice. In some embodiments, the portable apparatus further comprises a source of liquid attached to the main container, a second liquid outlet opening from the main container for controllably removing liquid from the main container without removing the food product, and a second outlet valve attached to or built into the source of liquid or into an attachment to the source of liquid, and wherein the controller is further configured for automatic control of the second outlet valve to control flow of liquid from the main container. In some embodiments, the controller further comprises an electric or magnetic means for automatically controlling the outlet valve. In some embodiments, parts of the apparatus in solid or liquid contact with the food are detachable from the apparatus for removal and cleaning in a household dishwasher. In some embodiments, the portable apparatus further comprises an inlet container connected to the inlet valve and liquid inlet via a tube, and further comprising an outlet container connected to the outlet valve and the liquid outlet via a tube, wherein the main container, the inlet container, the outlet container and the tubes are removable from the apparatus for separate cleaning.

In some embodiments, the portable apparatus further comprises one or more seasonings containers attached to the main container for providing seasonings to the food product inside the main container. In some embodiments, the portable apparatus further comprises a plurality of seasonings containers. In some embodiments, the portable apparatus further comprises an openable hatch in the seasonings container having an opening that leads to the main container for releasing the seasonings inside the seasonings container and into the main container. In some embodiments, the portable apparatus further comprises a liquid inlet connected to the seasonings container and leading to the seasonings container from a liquid source for delivering liquid into the seasonings container, and a liquid outlet connected to the seasonings container and leading from the seasonings container to the main container for delivering liquid and seasonings in the seasonings container to the main container. In some embodiments, the portable apparatus further comprises a liquid inlet valve connected to the liquid inlet for controlling inflow of liquid into the seasonings container. In some embodiments, the portable apparatus further comprises a liquid outlet valve connected to the liquid outlet for controlling outflow of liquid from the seasonings container. The seasonings container can be designed to hold a seasonings package containing the seasonings. In some embodiments, the portable apparatus further comprises a sensor proximal to the seasonings container for sensing contents of a seasoning container. In some embodiments, the portable apparatus further comprises a code-reading sensor proximal to the seasonings container for reading a code associated with a seasonings package inside the seasoning container. In some embodiments, the controller is further configured for controlling an opening or closing of the one or more seasonings containers according to a recipe to provide one or more seasonings to the food product. In some embodiments, the seasonings container is configured to contain a seasonings package, and further comprising a sensor associated with the seasonings container for reading a code on the seasonings package and for automatically communicating information read from the code to the controller, the code containing data about usage of one or more seasonings in the seasonings package. In some embodiments, the controller adjusts one or more parameters of the apparatus based on the information from the sensor read from the code on the seasonings package, the controller configured to open or close the inlet valve or the outlet valve for liquid delivery to or removal from the main container, the controller further configured deliver one or more seasonings from the main container according to a recipe.

In another aspect, the method is a method for preparing a food product in a portable apparatus. The method comprises receiving the food product into the main container of the portable apparatus having an inlet valve and an outlet valve that are both closed, receiving one or more settings input by a user, and opening the inlet valve connected to a liquid inlet in the main container for controllably providing a controlled amount of liquid into the main container with the food product while keeping the outlet valve closed. The method additionally comprises, responsive to the controlled amount of liquid being present in the main container, closing the inlet valve to stop inflow of the liquid into the main container. The method also comprises applying heat to the food product and liquid in the main container for preparing the food product, and opening the outlet valve connected to a liquid outlet in the main container for controllably removing liquid from the main container without removing the food product.

The method can further comprise various other steps and features. In some embodiments, the method is a method for cooking the food product, and wherein applying heat to the food product and the liquid further comprises applying sufficient heat for cooking the food product. In some embodiments, the method is a method for cooking the food product, and wherein applying heat to the food product and the liquid further comprises applying sufficient heat for cooking the food product. In some embodiments, the method is a method for sprouting the food product, and wherein applying heat to the food product and the liquid further comprises applying sufficient heat for sprouting the food product. In some embodiments, receiving one or more settings further comprises receiving setting for at least two cycles selected from a group consisting of: food product sprouting cycle, food product rinsing cycle, food product soaking cycle, food product cooking cycle, and apparatus self-cleaning cycle. In some embodiments, the method further comprises automatically starting a new cycle selected from the group of cycles responsive to completion of a cycle. In some embodiments, the method further comprises allowing the food product to cook for a specified time period. In some embodiments, the method further comprises allowing the food product to cook until the microcontroller determines the food is done cooking based on measurements from a sensor according to a recipe including computer readable instructions that specify cooking-doneness conditions. In some embodiments, the food product received is dry beans. In some embodiments, the method further comprises opening one or more seasonings containers associated with the apparatus to release one or more seasonings into the main container for seasoning the food product. In some embodiments, one of the seasonings containers contains flatulence-reducing additives released into the main container during a soaking cycle.

In some embodiments, receiving one or more settings further comprises receiving settings for a soaking cycle and a cooking cycle for the food product, where the soaking cycle further comprises the steps of: a) opening the inlet valve for providing liquid into the main container with the food product while keeping the outlet valve closed, b) closing the inlet valve to stop inflow of the liquid into the main container, c) allowing the food product to soak in the liquid for a specified time period, d) responsive to an end of the specified time period being reached, opening the outlet valve for removing liquid from the main container without removing the food product, and e) starting the cooking cycle responsive to an end of the soaking cycle. In some embodiments, receiving one or more settings further comprises receiving settings for a rinsing cycle and a cooking cycle for the food product, where the rinsing cycle further comprises the steps of: a) opening the inlet valve for providing liquid into the main container with the food product to rinse the food product, b) opening the outlet valve for removing liquid from the main container, c) allowing the food product to be rinsed in the liquid for a specified time period, d) responsive to an end of the specified time period being reached, closing the inlet and outlet valves, and e) starting the cooking cycle responsive to an end of the rinsing cycle. In some embodiments, receiving one or more settings further comprises receiving settings for a sprouting cycle and a cooking cycle for the food product, where the sprouting cycle further comprises the steps of: a) opening the inlet valve for providing liquid into the main container with the food product while keeping the outlet valve closed, b) closing the inlet valve to stop inflow of the liquid into the main container, c) allowing the food product to sprout until a sprouting recipe is completed, d) automatically adjusting environmental conditions inside the main container for sprouting of the food product, and, e) responsive to completion of the sprouting cycle being reached, starting the cooking cycle. In some embodiments, the method further comprises, upon removal of the food product from the main container, receiving one or more settings input by the user for a cleaning cycle for the apparatus, the cleaning cycle further comprising the steps of: a) opening the inlet valve for providing liquid into the main container, b) opening the outlet valve for removing liquid from the main container, c) allowing an inside of the apparatus to be rinsed by the liquid for a specified time period, and d) responsive to an end of the specified time period being reached, closing the inlet and outlet valves to end the cleaning cycle.

In some embodiments, the method is a sprouting method, and wherein the controlled amount of liquid is an amount of liquid sufficient to partially cover the food product for sprouting, and wherein applying heat further comprises applying heat needed to sprout the food product. In some embodiments, the sprouting method further comprises applying light to the food product for growth of the food product inside the main container. In some embodiments, the sprouting method further comprises providing air circulation to the food product for growth of the food product inside the main container. In some embodiments, the sprouting method further comprises allowing the food product to sprout, occasionally opening the outlet valve to drain the liquid in the main container and then closing the outlet valve, an occasionally opening the inlet valve to allow fresh liquid into the main container for continued sprouting. In some embodiments, the sprouting method further comprises automatically adjusting environmental conditions inside the main container for sprouting of the food product, wherein adjusting the environmental conditions comprises adjusting at least one of temperature inside the main container, liquid level inside the main container, air circulation inside the main container, and lighting inside the main container, and responsive to an end of the sprouting, automatically starting a new cycle without requiring further interaction by the user.

In some embodiments, the method is a cooking cycle for cooking the food product, and further comprising a sprouting cycle and a soaking cycle, the cycles comprising the steps of: a) opening the inlet valve for providing liquid into the main container with the food product, b) closing the inlet valve to stop inflow of the liquid into the main container, c) allowing the food product to sprout in the liquid, d) responsive to the sprouting being completed, starting the soaking cycle, e) opening the inlet valve for providing liquid into the main container with the food product, f) closing the inlet valve to stop inflow of the liquid into the main container, g) allowing the food product to soak in the liquid for a specified time period, h) responsive to an end of the specified time period being reached, opening the outlet valve for removing liquid from the main container without removing the food product, and i) starting the cooking cycle responsive to an end of the soaking cycle. In some embodiments, receiving one or more settings further comprises receiving settings for a multiple soaking cycle and a cooking cycle for the food product, the multiple soaking cycle further comprising the steps of: a) opening the inlet valve for providing liquid into the main container with the food product, b) closing the inlet valve to stop inflow of the liquid into the main container, c) allowing the food product to soak in the liquid for a specified time period, d) responsive to an end of the specified time period being reached, opening the outlet valve for removing liquid from the main container, e) repeating steps a) through d) a specified number of times for multiple soaking of the food product, and f) starting the cooking cycle responsive to an end of the multiple soaking cycles.

In a further aspect, the apparatus is a portable apparatus for sprouting a plant. The sprouting apparatus comprises a main container for holding the plant, a liquid inlet opening into the main container for controllably providing liquid into the main container with the plant, an inlet valve connected to the liquid inlet for automated regulation of inflow of the liquid into the main container, and a liquid outlet opening from the main container for controllably removing liquid from the main container without removing the plant. The sprouting apparatus also comprises an outlet valve connected to the liquid outlet for automated regulation of outflow of the liquid from the main container, a light source associated with the main container that provides wavelengths of light suitable to induce growth of the plant in the main container, and a controller in communication with the main container for automatically regulating the inflow of liquid into the main container and the outflow of the liquid from the main container.

The sprouting apparatus can further comprise various other components and features. In some embodiments, the sprouting apparatus further comprises a computer-readable storage medium storing computer instructions executable by a computer processor, the computer instructions comprising a recipe that specifies one or more parameters for operating the apparatus to sprout the plant. In some embodiments, the heater further comprises one or more heat sources attached to or built into the main container for controllably providing warmth to the main container. In some embodiments, the sprouting apparatus further comprises an air circulator in the main container for controlled inlet of fresh air into the main container. In some embodiments, the sprouting apparatus further comprises an inlet container attached to the inlet valve of the main container for containing the liquid provided to the main container through the inlet valve, and an outlet container attached to the outlet valve of the main container for receiving and containing the liquid drained from the main container through the outlet valve. In some embodiments, one or both of the inlet valve and the outlet valve are pumps for pumping water to and from the main container. In some embodiments, the plant is one of or a mixture of plants selected from a group consisting of: beans, legumes, cereals, grains and rice. In some embodiments, parts of the apparatus in solid or liquid contact with the plant are detachable from the apparatus for removal and cleaning in a household dishwasher.

In some embodiments, the sprouting apparatus further comprises an inlet container connected to the inlet valve and liquid inlet via a tube, and further comprising an outlet container connected to the outlet valve and the liquid outlet via a tube, wherein the main container, the inlet container, the outlet container and the tubes are removable from the apparatus for separate cleaning. In some embodiments, the controller is further configured to run one or more cycles selected from a group consisting of: a sprouting cycle for sprouting of the food product, a rinsing cycle for rinsing of the food product, a soaking cycle for soaking of the food product, and a cleaning cycle for self-cleaning of the apparatus. In some embodiments, the liquid outlet further comprises a side wall drain in the main container and a tube running up a side of the apparatus for using siphoning action to drain the liquid from the main container. In some embodiments, the sprouting apparatus further comprises a display unit including a user interface with which a user can interact with the apparatus. In some embodiments, the sprouting apparatus further comprises a plurality of sensors to providing feedback to the controller regarding a liquid level in the main container, the controller adjusting the liquid level in the main container based on readings from the sensors by controlling opening and closing of the inlet valve and the outlet valve to allow liquid to enter or be removed from the main container. In some embodiments, the sprouting apparatus further comprises a plurality of sensors to providing feedback to the controller regarding a temperature in the main container, the controller adjusting the temperature based on readings from the sensors. In some embodiments, the sprouting apparatus further comprises one or more seasonings containers attached to the main container for providing seasonings to the plant inside the main container. In some embodiments, the sprouting apparatus further comprises an agitator associated with the main container for agitating the liquid and the plan inside the main container.

In an additional aspect, the apparatus is a multi-chamber apparatus for preparing and cooking a plurality of food products. The multi-chamber apparatus comprises a first main container for holding a first food product, a second main container for holding a second food product, a first liquid inlet opening into the first main container for providing liquid into the first main container with the first food product, and a second liquid inlet opening into the second main container for providing liquid into the second main container with the second food product. The apparatus also comprises a first inlet valve connected to the first liquid inlet for automated regulation of inflow of the liquid into the first main container, a second inlet valve connected to the second liquid inlet for automated regulation of inflow of the liquid into the second main container, a first liquid outlet attached to the first main container for removing liquid from the first main container without removing the first food product, and a first outlet valve attached to the first liquid outlet for automated regulation of outflow of the liquid from the first main container. The apparatus further comprises a heater associated with the first and second main containers for automated heating of the first and second food products and the liquid, and a controller in communication with the first and second main containers for regulating the inflow of liquid into the first and second main containers, the outflow of the liquid from the first and second main containers, and the heating of the first and second food products and the liquid by the heater.

The multi-chamber apparatus can further comprise various other components and features. In some embodiments, the multi-chamber apparatus further comprises a second liquid outlet attached to a second main container for removing liquid from the second main container without removing the second food product. In some embodiments, the first inlet valve and the second inlet valve are part of one inlet-two outlet valve structure. In some embodiments, the first container has a first seasonings container and the second container has a second seasonings container, and the first seasonings container and second seasonings container are independently controllable to independently release seasonings into the first container and the second container.

Any one or more of the embodiments described can exist independently or can be combined with any of the other embodiments or include any one or more of the features of any of the other embodiments. The features and advantages described in this disclosure and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

FIGS. 6a, 6b, 6c, and 6d are cross-sectional views of different embodiments of a seasonings container of the apparatus for liquid control, according to embodiments of the invention.

The figures depict embodiments of the invention for purposes of illustration only. One skilled in the art will readily recognize from the following description that alternative embodiments of the structures and methods illustrated herein may be employed without departing from the principles of the invention described herein.

DETAILED DESCRIPTION OF THE INVENTION

I. Apparatus

FIG. 1 Apparatus

Figure 1:
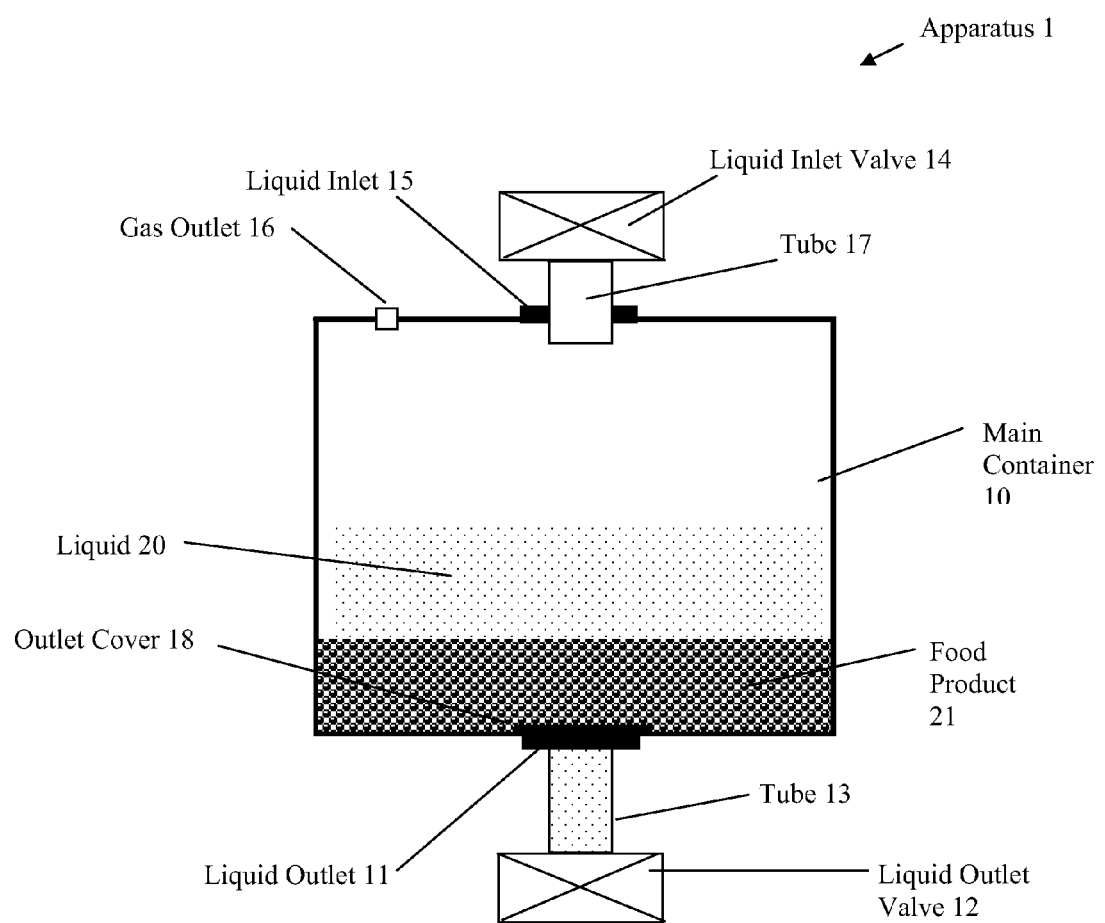
FIG. 1 is a cross-sectional view of a main container of the apparatus with a drain and valve, according to embodiments of the invention.

FIG. 1 illustrates the apparatus 1 according to an embodiment of the invention. Some embodiments of the apparatus have different and/or additional components than those shown in FIG. 1 and the other figures. Likewise, the functionalities can be distributed among the components in a manner different than described herein. Certain components and functions can be incorporated into other components of or associated with the apparatus. When describing the embodiments of the invention below, the examples frequently focus on food products, such as beans and rice, though these examples are meant for illustration only, and the invention is not limited to use with any particular food product or item. Similarly, where the word "apparatus" is used, it can refer to any of the apparatuses described herein (e.g. in all figures).

Referring now to the invention in more detail, in FIG. 1, there is shown a main container 10 with a number of openings, including a liquid inlet 15, a liquid outlet 11 (or drain), and a gas outlet 16. The liquid inlet 15 has a tube 17 attached to it that connects the main container 10 to a liquid inlet valve 14. The liquid outlet 11 also has a tube 13 attached to it that connects the main container 10 to a liquid outlet valve 12. In some embodiments, the tubes 17, 13 are not present and the liquid inlet valve 14 and liquid outlet valve 12 are connected directly to the main container 10.

Inside the main container 10 is a food product 21 and a liquid 20. The food product 21 can be any type of food product 21 that might require preparation and/or cooking, such as rice, beans, cereals, grains, vegetables, fruits, among others. In some embodiments, the food product 21 includes only solid food products 21, where the solid food product 21 cooked in the main container 10 is consumed by a user. The liquid 20 can be any type of liquid that might be used in the preparation and/or cooking of the food product 21, such as water, juice, sauces, among others. In the embodiment of FIG. 1, the food product 21 is shown immersed in the liquid 20. However, the liquid 20 can be at various levels relative to the food product 21, depending on the process being conducted by the apparatus 1. For example, where the food product 21 is beans, the liquid 20 can be at a lower level (e.g., not covering any of the beans or only covering some of the beans) for sprouting, though the liquid may be at a higher level (e.g. covering most or all of the beans) during soaking or cooking.

The main container 10 can be made of a variety of different. For example, the main container 10 can be designed out of metal, plastic, glass, ceramic, among others, or a combination of these. The material used can be a thermally conductive material for conduction of heat to the food product 21 and liquid 20 inside the container 10. In some embodiments, all or part of the main container 10 includes one or more surface treatments or coatings, such as a non-stick coating for easy removal of food product 21 inside and easy cleaning. The main container can also be removable or detachable from the apparatus 1 for separate cleaning. The main container 10 can further be designed to resist pressure and temperatures in the range of 5, 10, 15, 20, 25, 30 psi over the existing atmospheric pressure. At 15 psi (107 kPa) pressure boost relative to sea-level atmospheric pressure, for example, water boils at 122° C. (252° F.) and cooking times are reduced up to 70% while preserving nutrients and coloration of food to be cooked. The main container 10 can also be designed to resist the escape of liquids and of gases (other than through the gas outlet 16). For example, the main container 10 can include a lid (shown in later figures) or other cover, possibly with a seal to prevent undesired fluid escape. The lid can be a lock-top lid, hinged lid possibly with lock or latch, or other design.

The main container can also be designed in various sizes. The size dimensions of the main container 10 can include the largest dimensions (for example width, height, length, or diameter) of 75 cm, 60 cm, 50 cm, 40 cm, 30 cm, 20 cm, 15 cm, 10 cm, 5 cm, or larger or smaller as appropriate. The main container 10 can be designed to hold a specified amount of content, such as 2 cups, 4 cups, 8 cups, 10 cups 15 cups, 20 cups, 30 cups, or larger or smaller as appropriate. It can be designed to hold a specified number of servings of food, including 1, 2, 3, 4, 5, 6, 8, 10, 15, 20, 30 or more or fewer servings as appropriate. In some cases, the main container 10 can simultaneously hold a specified amount of food product 21 (e.g., at least one portion, such as 50 mL), and a specified amount of liquid 20 (e.g., 3-5 times the amount of food, such as 150-250 mL or more). In many cases, food product 21 will expand when soaked. For example, beans may expand to 2-3 times their original weight or size when soaked, so the amount of soaking water can be controlled correspondingly, e.g., from 1, 1.5, 2, 2.5, 3, 3.5, 4, 4.5, 5, 5.5, or 6 times the amount of dry beans or ingredients. In multiple rounds of soaking, the amount of liquid added may be adjusted for the amount of the amount of expansion of the food, e.g. the amount of liquid added will be adjusted for the amount liquid already absorbed. The main container 10 can also include markings for measuring an appropriate amount of food product 21 and/or liquid 20 to add to the container. In many embodiments, the main container sizing will be increased by an appropriate amount to allow for measurement error, to contain overflow, etc., for example 1%, 2%, 4%, 5%, 10%, 20%, 50%, 100% or other percentage or fixed size (e.g. a fixed size of the specified % larger than the mentioned sizes) larger than the maximum recommended fill level 110 (FIG. 5) for food and liquid contents.

The liquid outlet 11 can act as a drain that allows liquid 20 to be removed from the main container 10. This drain can be positioned in the center, bottom of the main container 10, as shown in the FIG. 1, or can be otherwise positioned (e.g., in the side of the container 10 or in the bottom but over to the side). Further, the bottom of the main container 10 can be sloped, curved, patterned with channels leading down to the outlet 11, etc., so that the outlet 11 is formed in a depression that allows for easier liquid collection and drainage.

In the embodiment of FIG. 1, the liquid outlet 11 is protected by an outlet cover 18 that allows liquid 20 to pass through without allowing larger particles (e.g., particles of food product 21) to pass through and into the tube 13. The outlet cover 18 can take on a number of forms or designs. For example, in one embodiment, the outlet cover 18 is a mesh or other filter that can prevent passage of most food particles while allowing the passage of liquid. The outlet cover 18 can contain a number of openings to allow passage of the liquid 20 that can be sized according to use of the apparatus 1. For example, the openings of the outlet cover 18 can be, e.g. 0.01, 0.45, 0.5, 1, 2, 3, 4, 5, 6, 7, or 8 mm in diameter/cross section or larger or smaller as appropriate. In some cases, smaller openings or filtration may be appropriate, for example retaining particles above 0.5, 1, 2, 5, 6, 10, 20, 30, 40, 50, 75, 100, 200, or 500 microns or larger or smaller. In one embodiment, the outlet cover 18 is a very fine mesh that allows only liquid 20 pass through into the tube 13 and prevents passage of food particles above a certain size (e.g., appropriate ranges as provided above). In another embodiment, the outlet cover is a mesh or perforated cover that prevents larger, substantially whole food particles from passing, but allows smaller solid waste material, such as small stones or grit, sand, and other impurities to pass through to achieve retention of food with elimination of waste material.

The outlet cover 18 can be detachable, removable, or otherwise separate from the main container 10 to allow for changing between different outlet covers or to facilitate separate cleaning. The outlet cover 18 can be flat, concave, convex, conical or semi-conical, cylindrical (e.g., oblique-, trapezoidal-, or elliptic-cylindrical), semi-spherical, symmetrical or irregular, a section and/or combination of these shapes. In some embodiments the outlet cover 18 is raised, moved, rotated, or lowered in order to increase the surface area of the cover and/or to lessen clogging of the drain. In some embodiments the outlet cover 18 has few or no holes, and is raised, rotated, lowered, or otherwise moved to form an opening of sufficient size to retain desirable particles in the main container while allowing other smaller or differently-shaped particles to drain from the main container 10. In some embodiments, the rate of draining is regulated to retain desired particles or remove undesired particles. In some embodiments, a slow rate of draining is used to limit the movement or removal of large particles.

The valves 12, 14 can be designed in various manners. For example, the valves 12, 14 can be designed out of metal, plastic, silicone, rubber, polymer, glass, graphite or composite materials, alloys, or combinations of these, among others. The size dimensions of the valves 12, 14 can be typically 20×40×80 mm, but this can vary depending on the desired embodiment's application. The two valves 12, 14 may be both designed in the same manner or may be designed differently for different functions (e.g., including different sizes, materials, etc.). Valve 14, tube 17 and inlet 15 can be sufficiently large in this embodiment to allow throughput of liquid 20 into the main container 10 in 0.25, 0.5, 1, 2, 3, 4, 5, 6 minutes or less.

The valves 12, 14 can take a variety of forms in different embodiments of the invention. In one embodiment, one or both of the valves 12, 14 are a cam shaft valve with a wheel that rotates into the tube(s) 13, 17. In another embodiment, one or both of the valves 12, 14 are a ball valve, including a ball attached to tube(s) 13, 17, where the ball includes an opening and the ball can be rotated so that the opening is in line with the opening of the tube(s) 13, 17 (e.g., open configuration, to drain liquid 20) or the opening is out of line with the opening of the tube(s) 13, 17 (e.g., closed configuration, to prevent drainage of liquid 20). In another embodiment, one or both of the valves 12, 14 are designed with components on either side of the tube(s) 13, 17 to pinch the tubes closed, or removing pinching to allow the tubes to be open. In some embodiments, one or both of the valves, or other valves in the invention, include ball valves, reversible or other flap valves, piston valves, rotary valves, butterfly valves, multi-port valves, non-return or one-way valves, check valves, pumps, etc. In a further embodiment, one or both of the valves 12, 14 are designed with a flap resting against or within the tube(s) 13, 17 that opens or closes the tubes. The flap can be similar to a reversible flap valve or flap valve (e.g. toilet-bowel-flap-like) that pushes upward to close the tube. Similarly, the flap can be designed to be in a default closed state that then opens when liquid 20 comes through. The valves 12, 14 can also be multi-port valves having more than one opening that allow liquid to pass into and/or out of the valve (e.g. valve 14 in multi-chamber embodiment). The tubes can also be designed to be default state closed tubes that have a mechanism (valves 12, 14) that pinches or otherwise mechanically causes the tube to open for flushing of liquid 20. In some embodiments, the valves 12, 14 can be used to regulate pressure inside the main container 10.

In some embodiments, the term "valve" can also include or mean a pump that moves the liquid by creating pressure. Thus, one or both of the valves 12, 14 can be a pump system that pumps liquid 20 into or out of the main container 10. In some cases, steam or other pressure will be used to push liquid into the outlet tube. Generally throughout this specification the term valve includes a pump, a valve, or a combination of these. For example, one of "valves" 12, 14 can be a pump, and the other a valve, even though both are generally called valves herein. In some embodiments, the valves 12, 14 can be designed to be non-backflow valves.

The tubes 13, 17 can be designed in various manners. For example, the tubes 13, 17 can be designed out of rubber, plastic, silicone, metal, composite material, glass, polymers, or combinations of these, among others. In some embodiments, the tubes include one or more surface treatments or coatings, such as a non-stick coating. Indeed, in some embodiments, all or any parts of the apparatus may include such surface treatments or coatings. The size dimensions of the tubes 13, 17 can be, for example 1, 2, 3, 4, 4.5, 5, 6, 7, 8, 9, 10, 20, 25 mm inner diameter, 0.5, 1, 2, 2.5, 3, 5, 6 mm walls and 0, 1, 5, 10, 20, 30, 50, 100, 200, 300, 500, 1000 mm long. The two tubes 13, 17 may be both designed in the same manner or may be designed differently for different functions (e.g., including different sizes, materials, etc.).

The gas outlet 16 is an opening in the main container 10 that allows gas to exit from the main container 10. The gas outlet 16 can include a filter or other cover designed to prevent the exit of food particles or items other than gases exiting the main container 10. The gas exiting the main container 10 may be steam created from the heating of the liquid 20 in the main container 10. The gas outlet 16 can be designed to be openable or closeable by the user or by a controller (described regarding FIG. 3). In some embodiments, the gas outlet 16 is a pressure release valve, and is designed to allow the apparatus 1 to function as a pressure cooker. In this case, the main container can be a pressure vessel for cooking food products at a specified temperature (e.g., above 100° C.) and at an elevated pressure above atmospheric pressure. In some embodiments, both an automatic pressure-release valve and a controllable outlet valve are included. For example, these might be included in cases where a pressure-release valve provides a safety mechanism and a controllable outlet valve allows regulation of pressure within a safe pressure range. In some embodiments, the gas outlet is a cartridge or structure removable from the apparatus 1, and in some such cases the gas outlet is surrounded by a seal to substantially prevent gas from leaking around the edges of the gas outlet. The gas outlet 16 may not be present in all embodiments of the apparatus 1.

The apparatus 1 can further include an air pump, fan, or passive opening ("air circulator") to allow for or regulate the circulation of air within the apparatus 1. The air circulator can be used to circulate air (e.g. hot or cool, stale or fresh air) into or out of the apparatus. The air circulator can be integrated within the gas outlet 16, though in other embodiments it may share any or all of the noted characteristics of a gas outlet, but be physically separate. The air circulator can be integrated within the liquid inlet valve 14, or be a separate structure or separate insert into the lid. The lid, main container, and seals may be arranged prevent free circulation of air between the main container and the outside atmosphere. Hence, the contents of the main container may be substantially isolated from the outside atmosphere. However, controlled circulation or inlet of fresh air may be achieved by the use of an air circulator.

Still referring to the embodiment of FIG. 1, in operation, the liquid valve 14 allows liquid to enter the main container 10 through tube 17 and liquid inlet 15, while liquid 20 is independently allowed to escape from main container 10 through outlet cover 18 and liquid outlet 11 into liquid tube 13. The valve 14 regulates inflow of the liquid 20 into the main container 10 and the valve 12 regulates the outflow of the liquid 20 from the main container 10. The gas outlet 16 regulates the pressure inside main container 10. The food product 21, mixed with liquid 20, is barred from entering into liquid tube 13 because of the outlet cover 18. The liquid 20 inside main container 10 can hence be regulated in both level and time.

The embodiment of FIG. 1 thus allows control of the liquid environment inside main container 10. The control provided by the embodiment of FIG. 1 is useful in hydration (soaking) of beans and legumes, which can be automated by automating the function valves 12 and 14. Furthermore, by enabling automated heating of the main container 10 or apparatus 1, for example through the control by a micro controller, a fully automated soaker and fresh water cooker is achieved. This particular use of the embodiment in FIG. 1 is further depicted in FIG. 2.

FIG. 2 Apparatus

Figure 2:
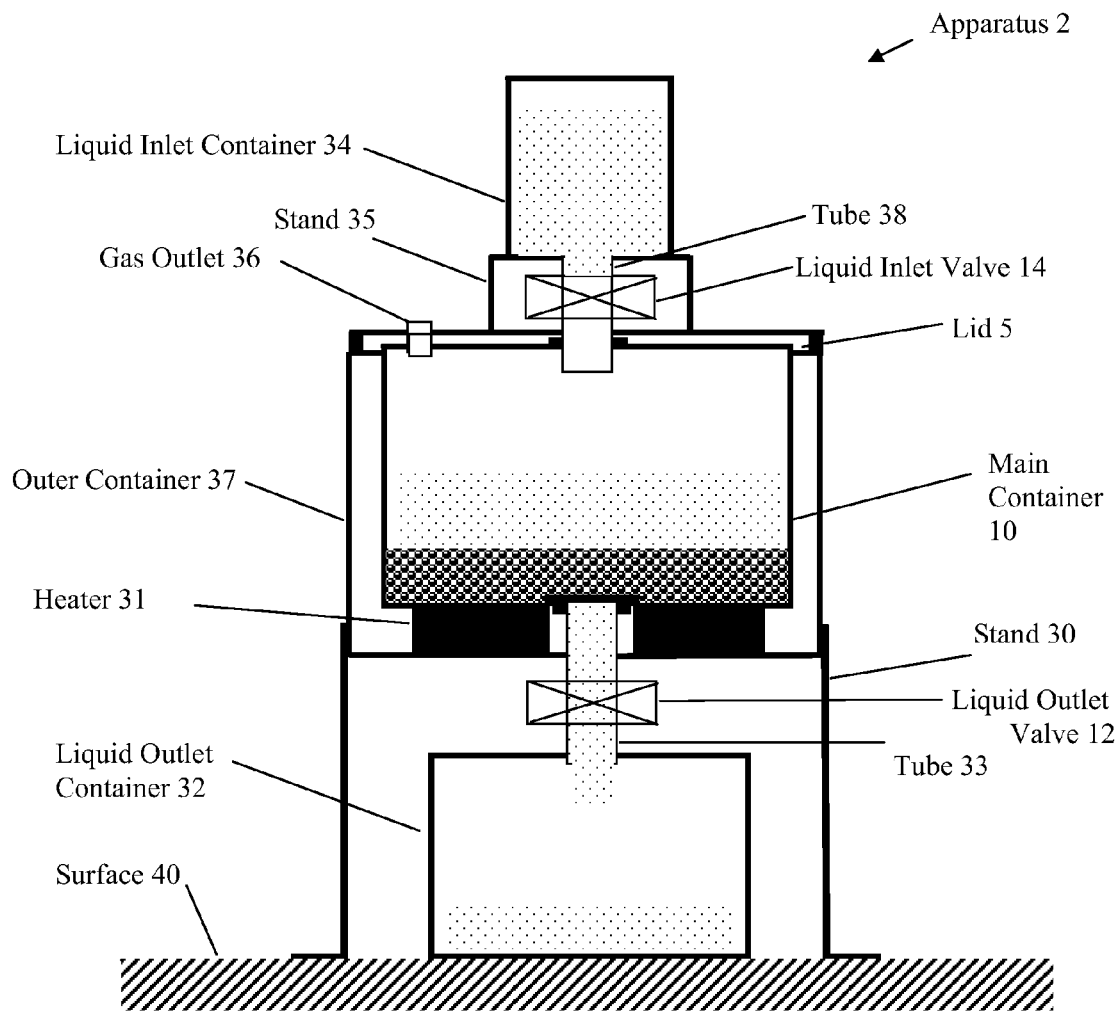
FIG. 2 is a cross-sectional view of the apparatus for liquid control, according to embodiments of the invention.

Referring now to FIG. 2, there is shown an embodiment of the apparatus 2 that includes the apparatus 1 of FIG. 1, according to an embodiment of the invention. The apparatus of FIG. 2 includes a heater 31 for cooking the food product 21. In the apparatus 2 of FIG. 2, the main container 10 directly rests on top of the heater 31. However, the heater 31 can be otherwise positioned relative to the main container 10 (e.g., above, surrounding, or on one or more sides of the main container), and does not have to be directly in contact with or attached to the main container 10.

In the embodiment of FIG. 2, the apparatus 1 of FIG. 1 rests inside an outer container 37 of the apparatus 2. The outer container 31 rests on a stand 30. On top of the outer container 31 rests a liquid inlet container 34 positioned in place by stand 35. In the embodiment of FIG. 2, the stand 35 stretches over the top of the outer container 37 and/or main container 10, and also contains a gas outlet 36 that is generally positioned above the gas outlet 16 of the main container 10. However, in other embodiments the stand 35 is designed or shaped differently or has a smaller and/or more open (e.g. in continuous contact/circulation with the outside air though openings in the container 10 or its lid) configuration so as to not require a gas outlet 36. The stand 30, in FIG. 2, rests on a surface 40 (e.g., a counter, tabletop, desktop, etc.). In some embodiments, the stand 30 is not present, and the main container 10 rests directly on top of the liquid outlet container 32 or on another surface (e.g., on a kitchen counter or tabletop). Similarly, in some embodiments, the stand 35 is not present and the liquid inlet container 34 is positioned directly on top of the main container 10.

One or both of the liquid inlet container 34 and the liquid outlet container 32 can be positioned in various ways relative to the main container 10 (e.g., to the side of the main container 10, not in contact with the main container or any stands 30, 35, etc.). In some embodiments, one or both of the liquid inlet container 34 and the liquid outlet container 32 are not present in the apparatus 2, and instead the valve 14 or other component is connected directly to a water source (e.g., a water faucet or home water pipe) and the valve 12 or other component is connected directly to a water disposal (e.g., a kitchen drain or hose, a kitchen pipe, resting in a sink, attached to a temporary container or removable bottle, etc.).

As was shown in FIG. 1, the main container of FIG. 2 includes a liquid inlet 15 and a liquid outlet 11 connected by tubing. The liquid inlet 15 is connected to the valve 14 via a tube 17 and the liquid outlet 11 is connected via a tube 13 to the valve 12. In the embodiment of FIG. 2, the liquid inlet container 34 is connected to the valve 14 via tube 38, and the valve 12 is extended with a tube 33 that terminates inside liquid outlet container 32. The tubes 38, 33 can be constructed similarly or differently from the tubes 17, 13. The tubes 17, 38 and the tubes 13, 33 can each be separate tubes (e.g., four tubes), or the tubes 17 and 38 can form a single tube that runs through the valve 14 as can the tubes 13 and 33 form a single tube that runs through the valve 12. In some embodiments, inlet for liquid 15 may be an open tube, but may also be a single-nozzle or multi-nozzle sprayer, mister, liquid atomizer, or other means to evenly or directionally distribute, spray, mist, and/or otherwise control the form of the liquid and location within the main container where the liquid is delivered. For example, the inlet can include a mister or sprayer to evenly spray or mist the bottom, walls, or surface of contents of the main container. In some embodiments, the inlet for liquid 15 may be designed to regulate the rate of delivery of liquid to the main container. For example, inlet for liquid 15 may be designed to facilitate cleaning of the surface(s) of the chamber 10, to facilitate sprouting, self-cleaning, to reduce or control foam, distribution of the food, to minimize splashing of the materials already in the chamber 10, to maintain a controlled temperature environment in the main chamber by regulating the rate of liquid delivery in conjunction with heating or cooling of the chamber, etc. For example, the invention may deliver the liquid from multiple locations, at a controlled rate, and/or through one or more nozzles. For example, part of the inner wall of the lid could be perforated, like a shower head, so the water can drop on much of the inner area of the pot. In some embodiments, the invention comprises several nozzles, such as nozzles that spray a mist (e.g. when using pressure or a pump to deliver the liquid).

The tubes connecting liquid inlet container 34, liquid outlet container 32, and the main container 10 can be of various types and sizes. The tubes can be rigid or flexible tubes (e.g. tubing, pipes, hoses, features molded into the containers, valves, or other components, etc.) of various lengths, including over longer distances or by direct connection or o-ring/seal connection. The tubes can have lengths of 0 mm, 0.5 mm, 1 mm, 2 mm, 3 mm, 4 mm, 5 mm, 10 mm, 15 mm, 20 mm, 0.25 cm, 0.5 cm, 1 cm, 5 cm, 10 cm, 20 cm, 30 cm, 50 cm, 1 m, 1.5 m, 2 m, 2.5 m, 3 m, 5 m, or more or less in order to connect the containers. In some embodiments, some or all of the tubes in the various embodiments of the apparatus will be food-grade tubes (e.g., with an FDA Acceptable Food Grade rating). In some embodiments, some or all of the tubes in the various embodiments of the apparatus will have temperature range ratings from −40, −30, −20, −10, 0, 10 degrees Fahrenheit to 150, 175, 195, 200, 212, boiling, 260, 300, 350, 400, 450, 500, 550 degrees Fahrenheit, or higher or lower. In some embodiments, one or more valves (e.g. 14, 12) will be present on one or both ends of tubes, or somewhere along their lengths (e.g. in order to position or change the number of valves and diversity of types of valves) to reliably control the flow of fluids to or from those tubes. Valves, covers, or other structures proximal to outlet 11 may be arranged such that main container 10 may be removed from the outer container in a leak-free manner, e.g. for removal and use as a serving dish at a dinner table. In some embodiments the valve 14, outlet cover 18, or other structure capable proximal to outlet 11 and of preventing food and liquid from leaving the main container 10 are designed such that food and liquid do not exit the main container 10 through liquid outlet 11 when main container is detached and removed from the apparatus. That structure may close automatically before or at the time that main container 10 is detached from the rest of the apparatus, e.g. when main container 10 is detached from outer container 37.

The liquid inlet 15 can be positioned in various ways. For example, the liquid inlet 15 can be in the top or lid 5 of the container 10, in or over the side of the container 10, at the bottom (possibly combined with outlet 11) and so forth. In some embodiments, the liquid inlet 15 provides liquid to container 10 from multiple locations, e.g. multiple spouts other types of inlets in the lid 5 or top or walls or floor of container 10. The liquid inlet 15 can provide multiple locations of entry to reduce points of failure due to clogging of a single entry point to container 10. In some embodiments, liquid inlet 15 can controllably divert its flow to provide liquid that enters main container 10 through the outlet 11, for example in a flushing application to clean, unclog, or preemptively flush outlet 10 and/or outlet cover 18. In some such embodiments, valves possibly including valves 12 and 14 are operated in conjunction such that the liquid from liquid inlet 15 enters main container 10 by passing "in reverse direction" through the outlet 11 and/or outlet cover 18. For example, by providing a valve 14 that can redirect flow output to multiple outlets, and providing a tube connecting valve 14 to tube 13 or the "back side" of outlet 11 or cover 18, and then operating valve 14 to direct liquid to flow to enter "in reverse direction" through outlet 11 or cover 18, while also closing outlet valve 12 so that the liquid will not drain out of the main container 10, a "back-flush" effect can be achieved.

The liquid 20 can be moved to and from the containers 32, 34 in various manners. In some embodiments, liquid 20 enters the main container 10 using pressure (e.g., using water pressure from a kitchen faucet, household pipes, or using a pump to push liquid 20 in). In other embodiments, liquid 20 enters the main container 10 via gravity (e.g., by placing the liquid inlet container 34 high enough relative to the main container 10). In this case, the liquid inlet container 34 is a gravity-operated container positioned above the main container 10 (e.g., as a lid) or to the side of the container for providing liquid by gravity. The liquid inlet container 34 or the liquid outlet container 32, or both, can be built into, attached to, or separate from the main container 10. Both of the containers 32, 34 can be removable for cleaning. The liquid inlet container 34 can be removed for filling with liquid, and the liquid outlet container 32 can be removed for dumping or secondary use (e.g. as sterilized water) of waste liquid. The containers 32, 34 have openings to which the tubes 33, 38 connect to allow water transfer. These openings can be used to fill or remove water, or the containers 32, 34 can have separate openings for this. In one embodiment, only the outlet container 32 is removable, and it is filled with liquid manually that is then used to pour into and fill the inlet container 34.

The outer container 37 can be designed for energy efficiency. In some embodiments, the outer container 37 comprises an insulation layer to insulate the main container 10, for example to maintain its temperature, to mitigate heat flow to or from main container 10, etc. The entire apparatus can be designed for energy efficiency by incorporating insulation in the outer container 37 or providing insulation in a lid 5 for the main container 10, where the lid 5 is possibly incorporated as part of the outer container 37. In some embodiments, a heat-exchanger will be incorporated to recover heat from liquid flowing from the outlet container and/or for cooling main container 10. Tubes including a heat exchanger can be used to heat liquids in liquid inlet container 34 or outlet container 32. In some embodiments, all or part of the outer container 37 is designed to be liquid-resistant or liquid-proof, possibly including a secondary containment vessel or area for liquid or liquid-bearing gas that inadvertently escapes or leaks from other parts of the invention including main container 10, liquid container 34, and/or other valves, tubes, and liquid-bearing areas of the apparatus. A secondary drain can also be provided to drain liquid from the secondary containment area(s); that drain may be passive or pumped, held in a secondary containment area, cup, or diverted/drained to container 32, possibly through a valved or unvalved connection to tube 13 before or after valve(s) 12.

Still referring to the embodiment of FIG. 2, in operation, the heater 31 allows for heating of the main container 10, while gases can escape through the gas outlet 36. The liquid inlet container 34 stores liquid that is allowed to flow to the main container 10 through the valve 14 and is held in place, on top of main container 10, by the stand 35. The liquid inlet container 34 is the receptacle for the liquid escaping through liquid valve 12. The outer container 37 can provide a heat barrier as well as a visually pleasing design on the outside. The stand 30 allows liquid container 32 to fit underneath valve 12 and tube 33, as well as providing a visually pleasing design on the outside. By automatic and independent control of the heater 31 and the valves 12 and 14, for example through the control by a microcontroller hidden inside outer container 37, a fully automated soaker and fresh water cooker is achieved.

The display unit(s) 41a, 41b can take various forms or locations. FIG. 2 shows two possible locations for one or more display units as 41a and 41b, though placing them on the top, bottom, side, nearby but by with wired, wireless, or network communication, etc., is possible. For illustration, the food product 21, in FIG. 2, can be exemplified by black beans and is entered into main container 10 by the user. The liquid 20 in container 34 can be exemplified by water and is also entered by the user. The user can then enter various types of information into a display unit 41 (shown in FIG. 3) or other type of user interface. For example, the user can enter information about the type of food product 21 (beans, rice, vegetables, etc.) and the specific kind of that food product (e.g., black beans, pinto beans, etc.), in this case black beans. In some embodiments, the user can enter one or more additional details, including the amount of food product 21 (e.g., in one or more different measurements, such as pounds, ounces, etc.) or a level of food product (e.g., marked by visible, physical markings inside the main container 10) or an amount of food product 21 added (e.g., ½ cup, 1, 2, 3, 4, or 5 cups, etc.). The user can also enter timing data, such as when the food should be ready, when it was added, when the user will be home to check on it, etc. In some embodiments, the user can further enter different preparation or cooking cycles (e.g., sprouting, soaking, cooking, warming, etc. by applying a recipe to automate the corresponding process). The display unit 41 can include a keypad, web server, touchpad, WiFi or network connection with software API, or other mechanism for user manipulation.

In further detail, still referring to the invention of FIG. 2, liquid inlet container 34 can be sufficiently large to hold around 150 mL of liquid. Stand 35 can fit snugly on top of main container 10 and be spacious enough to house tube 38 and valve 14. Stand 35 can also have a visually pleasing outer design. Outer container 37 can be large enough to completely enclose main container 10, as well as to have enough space in between to provide sufficient heat insulation to allow for efficient heating of main container 10 and to render outer container 34 pleasant or not too hot to the touch from the outside. In some embodiments, the insulation in the apparatus is sufficient to substantially maintain the temperature of the main container for an hour, two hours, three hours, four or five hours, eight hours or more with minimal or no additional energy input, e.g. In some cases, including insulation substantially on all sides of the main container 10. In some cases, the apparatus includes an insulation layer in physical communication with the main container 10 such that the ready temperature or temperature range can be maintained with little or no additional energy input, such that the device can be unplugged from outside power sources while maintaining a pre-determined temperature range in the main container for 1, 2, 3, 4, 5, 10 hours or more, and in some embodiments the apparatus will include a temperature sensor and indicator that indicates one or more of: the current temperature, whether the temperature is in the ready range, the estimated time until the main container will leave the ready temperature range without additional energy being added to the apparatus (e.g. time the apparatus will maintain the main container within a desired temperature without being plugged in).

The liquid outlet container 32 can be large enough to hold the discharged soaking liquid from main container 10, e.g., at least 150 mL. Stand 30 can be tall enough or large enough to house liquid outlet container 32, tube 33, and valve 12, but it may not necessarily completely enclose liquid outlet container 32. Heater 31 can be powerful enough to safely boil the liquid and the food product. The heater 31 can be designed to do this boiling in less than 5 min, 10 min, 15 min, ½ hour, less than an hour, less than 2 hours, or longer or shorter.

FIG. 3 Apparatus

Figure 3:
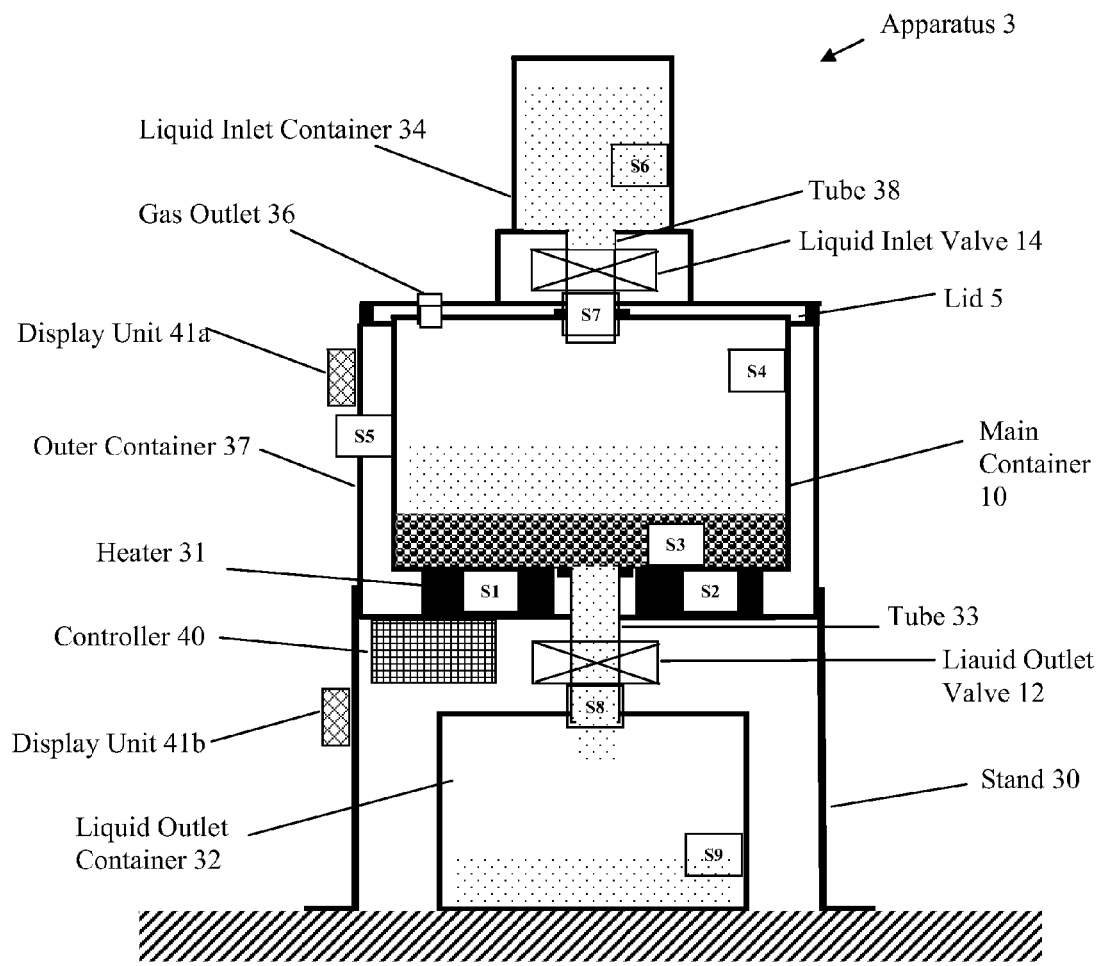
FIG. 3 is a cross-sectional view of the apparatus for liquid control including sensors and a controller, according to embodiments of the invention.

Referring now to FIG. 3, there is shown an embodiment of an apparatus 3, according to an embodiment of the invention. The embodiment of FIG. 3 includes a control box 40 that can be connected to a key pad associated with a display unit 41, and that can also be connected to a various sensors S1-S9 in multiple sensor locations. In some embodiments, a keypad will be understood to include the idea of a voice control unit, a mouse or touchpad device, a touch-sensitive screen, a control unit connected over a network, or any of the other user input means known in the appliance or mobile device fields. The sensors can be sensors of variety of types, including temperature sensors, weight sensors, pressure sensors, optic sensors, liquid level sensors, liquid flow sensors, ultrasonic sensors, infrared sensors, eatability or cooking status sensors (ECS sensors), any of the other sensors listed in this document, or others. For example, sensors S1 and S2 can be temperature sensors or weight sensors. Sensor S3 can be a temperature sensor or a special ECS (eatability (i.e. suitability for eating; edibility) or cooking status) sensor. Sensors S4 and S5 can be temperature or pressure sensors or optic sensors observing the food product 21. Sensors S6 and S9 can be liquid level sensors or temperature sensors. Sensors S7 and S8 can be liquid flow sensors. The embodiment of FIG. 3 illustrates eight sensors, though there can be more or fewer sensors as needed, which can be in the same locations or in other locations not illustrated in FIG. 3. In addition, some sensors can be designed to have more than one function or include more than one sensor type.

The apparatus can be designed to automatically or semi-automatically determine key parameters of the ingredients (e.g. food) provided. For example, the apparatus can incorporate a sensor to weigh the main container and thereby determine thereby determine the amount of ingredients provided, a sensor to measure the level of contents of the main container and thereby determine the liquid level or amount of ingredients added, a scanner or RFID-tag reader or other standard labeling reader to read a code from ingredients' packaging, etc. In some embodiments, such sensors are used to improve the user experience by automatically determining key parameters of the ingredients or readout on the progress through a recipe; to measure the operation of the apparatus itself and provide feedback for more accurate cooking, to indicate to a user the progress through a recipe or status of the apparatus or food contents, etc. For the purposes of our apparatus, a "recipe" is a machine-readable set of instructions for operating the apparatus. The apparatus can also incorporate one or more weight sensors, piezoelectric sensors, clocks or time sensors, scales to measure the weight or changes in weight of the main container 10, infrared (IR) sensors, barcode sensors, RFID sensors, pH sensors, conductance or capacitance sensors, liquid or atmospheric pressure sensors, optical sensors, imaging sensors, cameras providing an image of the inside of the main container, temperature sensors, mechanical sensors to determine the viscosity or resistance to stirring in the main container, voltage or current or energy usage sensors, or combinations of these or other sensors. Commonly, the sensors will be configured to report on conditions of the main container, though other areas such as valve positions, liquid flows, other liquid containers or containment areas, gas outlets, external conditions, etc. may be measured. Some additional examples include measuring the ambient temperature, pressure, and/or altitude to adjust the operation of the apparatus (e.g. to adjust the recipe for altitude), reading an IR sensor inside cooking vessel that looks at (e.g.) beans (or food product) to determine their softness/if they are done (possibly including illumination by an IR diode or light directing illumination into the main container 10), providing a stirrer or mechanical sensor to measure change in viscosity or resistance-level to stirring to determine progress of a recipe step (e.g. final cooking of beans) is completed (e.g. beans are soft and done), etc.

In some embodiments, the sensors' measurements can be used to simplify recipes and ease of use simultaneously. Using beans as an example, by measuring when beans are cooked the user can avoid entering information about the type of beans used and the recipe can also be simplified by providing "done-ness" rules or formulae or recipe(s) in terms of the sensor readout rather than simple time-of-cooking measurements. By using sensor feedback, as in this example, the user can just throw beans in the main container and the apparatus will measure when they are cooked to perfection, rather than just applying a static duration, bean-type-dependent recipe. Ultrasound sensors, infrared sensors cameras possibly coupled with image or signal analysis software, and other sensors can be used in this bean recipe-stage-doneness-detection example or in recipes in general.

The apparatus can further include a control box or controller 40 or other microcontroller. A program in the microcontroller can automatically open and close valves 14, 12. In one embodiment, the program automatically opens valve 14 to supply the right amount of water from the liquid inlet container 34 into main container 10 to properly soak a food product such as black beans. When the soaking cycle is completed, the microcontroller can allow the valve 12 to discharge the soaking water from main container 10 into the liquid outlet container 32. Once the water is fully drained, the microcontroller can order the valve 12 to close, and order the valve 14 to supply the right amount of fresh cooking water into main container 10. Upon arriving at the proper or desired water level in the main container 10, the microcontroller can order the valve 14 to close and the heater 31 to start operating according to a particular common recipe-stage or heating cycle (e.g., one that has been especially designed for cooking beans (e.g. black beans)). When the heating cycle is completed, the micro controller can order the heater 31 to enter a special cycle that keeps the main container 10 contents "ready", e.g. for use in another recipe or for mealtime eating (e.g. warm), for the desired amount of time (e.g., as specified by the user or by a pre-set warming/resting/cooling cycle).

In some embodiments, conditions suitable for keeping contents ready will be specified by a recipe. The recipe used to cook those contents may include instructions for conditions suitable for keeping the contents ready for use; in other cases, such as when the recipe did not include keep-ready instructions, the microcontroller will apply a second recipe such as a general food warming temperature recipe, a specific recipe for the type of product of the recipe used to cook those contents (e.g. cool down for sushi rice recipe, warm to 140 F for beans, etc), a second recipe (e.g. preferred warming conditions selected by the user). In some embodiments, the apparatus will also apply one or more recipes for spoilage. In some cases, the apparatus will alert the user or take corrective action when one or more recipe conditions are violated, problems occur, or spoilage remediation recipes apply. For example, cooked food kept at 60-120 F for two hours or more can be subject to rapid growth of bacteria and toxin production, and a recipe for spoilage remediation could include alerting the user to these conditions, automatically raising the temperature of the main container to a higher temperature periodically, etc. In some embodiments, one or more recipes are stored on a computer-readable storage medium (e.g., a flash memory, RAM, ROM, disks, etc.) that stores instructions (e.g., computer program instructions) that can be executed by a computer processor for operating the apparatus according to the recipe. Thus, there can be recipes for preparing different food products (e.g., beans, rice, etc.) or different types of food products (e.g., black beans, pinto beans), and so forth. The recipe can specify the appropriate temperatures, lengths of time, quantities of food product or liquid, etc., and can the controller 40 can operate the device according to the directions specified in the recipe.

In the embodiment of FIG. 3, the control box 40 allows interaction with the user through the key pad associated with a display unit 41. The user can enter information in order for the control box 40 to be able to compute and execute the desired operation of the heater 31 and the valves 12 and 14. But to simplify the user interaction, the sensors S1 to S8, as well as additional sensors in additional locations, can aid the control box 40 in achieving the desired operation of the apparatus 3 in FIG. 3 (or of apparatuses 1 or 2 in FIG. 1 or 2). For example, where sensors S1, S3, and S4 are temperature sensors, these can inform the control box 40 of the temperature of the heater 31 or the main container 10, which will allow the control box 40 to precisely adjust the temperature of the heater 31, and thus of the main container 10. Where sensor S2 is a weight sensor, it can measure both the weight and the weight change of the main container 10, which allows the control box 40 to log the amount of water and the amount of food product 21 entered into the main container 10. Where sensor S3 is an ECS sensor, it can inform the control box 40 of the cooking status of the food product 21, so that the control box 40 can assure desired operation where information regarding the type of food product 21 or the cooking time is not available. Where sensors S4 or S5 are pressure sensors, they can inform the control box 40 of the gas pressure inside main container 10, which also provides a measurement of the temperature. Where sensors S7 and S8 are liquid flow sensors, they can measure the flow of liquid in the tubes 38 and 33 respectively. In some embodiments, the sensors S3, S4, S6 and S9 measure the liquid levels in their respective containers. Where sensors S4 and S5 are optic sensors, they can be cameras or optical detectors that deliver optical information to control box 40 so that a software program (e.g., image recognition program) can determine the type or amount of food product 21 or the amount of liquid in main container 10. Furthermore, optic sensors S4 and S5 can also reveal the cooking status of the food product 21 by observing a food product texture change or transition.

In some embodiments, the optic sensors can provide a report on the contents of the main container, the cooking status, and/or a camera "webcam"-like image of the contents of the main container in order to allow users to monitor the contents of the main container. For example, in some embodiments the optic sensors can be used to "see" the cooking progress, to watch a sprouting process, or otherwise view what is happening inside the main container. In some embodiments the apparatus will transmit information, including sensor or camera information, over a network for remote monitoring or control. For example, one could use the apparatus as a webcam to watch the progress of a recipe being applied, e.g. a sprouting recipe to watch sprouting, remotely, for example as "Sprout Cam", possibly on a display attached to or integrated into container 37, e.g. as a "virtual window" to view the contents of the apparatus.

Still referring to the embodiment of FIG. 3, the exact locations of sensors S1 to S9, as well as any other sensors, can vary widely in the apparatus. FIG. 3 only serves to illustrate one example of plausible such locations. Furthermore, the exact function of sensors S1-S9 may also vary in the apparatus. For example, an ECS sensor S3 can measure the cooking status of the food product 21 through probing the interior of the food stuff through ultrasonic waves or by observing the infrared radiation from the food stuff. The optic sensors S4 and S5 can have a light source built in, illuminating the liquid and the food product or the light source can be located elsewhere in main container 10. In some cases, sensors will in communication with the conditions of container 10 and located proximal to container 10, but not directly in container 10. For example, optical sensors can be located inside or above the lid 5 or in the body 37 and separated by transparent materials such as a window or optic cable, temperature sensors can be connected by one or more heat-conducting materials, ultrasound sensors can be connected by acoustic coupling materials, weight sensors can be located under the bottom or rim of main container 10 or of structures supporting main container 10. Similarly, pH, capacitance, conductance, or electric field sensors can be connected by physical connectors conducting or transmitting the electromagnetic or other phenomenon they respectively use for sensing, etc. A variety of other examples are also possible.

II. Multi-Chamber Apparatus

Figure 4:
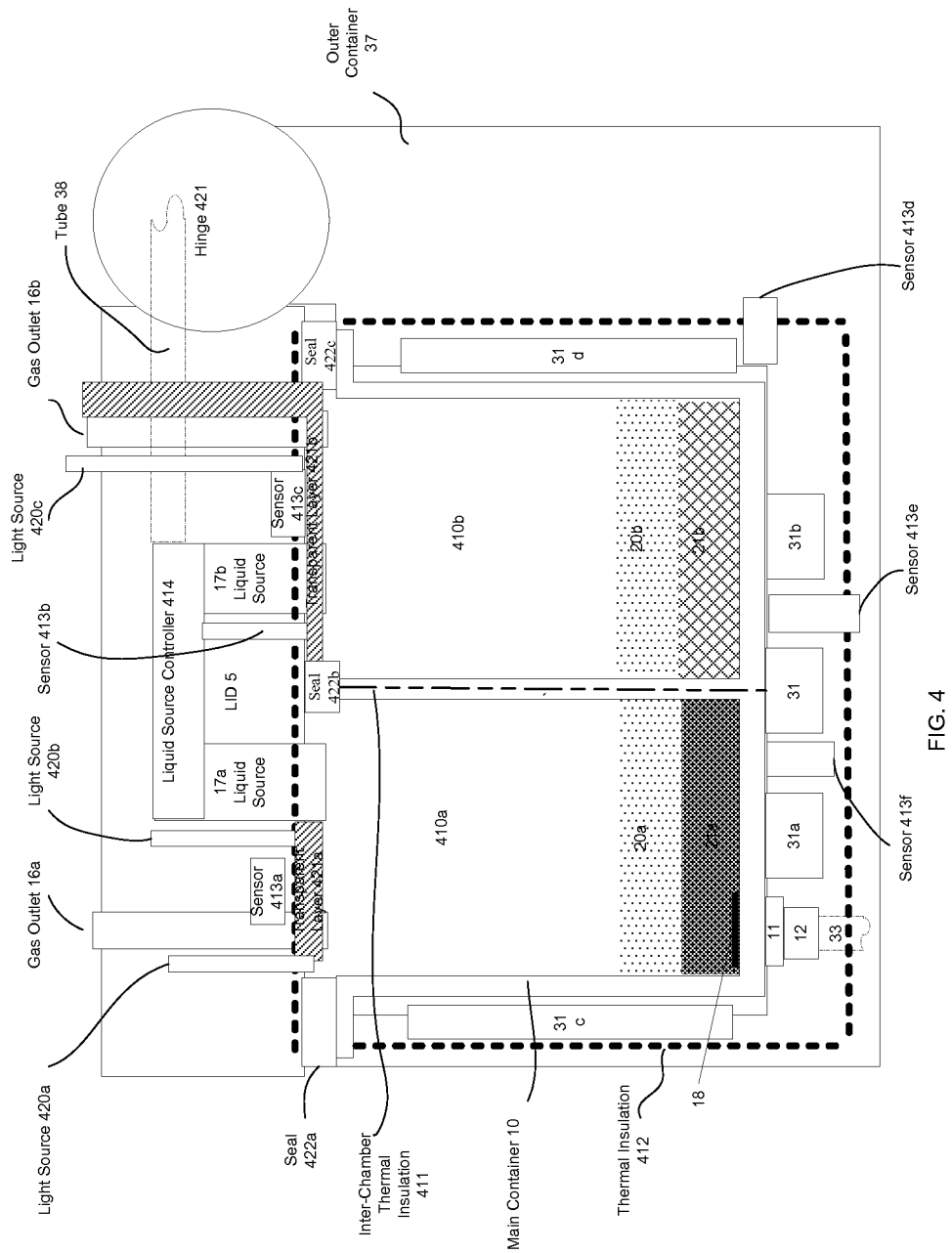
FIG. 4 is a cross-sectional view of the multi-chamber apparatus for liquid control, according to embodiments of the invention.

Some designs of the apparatus include multiple main containers for coordinated preparation of multiple final products. FIG. 4 illustrates a multi-chamber apparatus, according to some embodiments of the invention. These multiple chambers can be used for cooking different food products under different or distinct conditions in each chamber. For example, beans and rice are best prepared separately, but together they produce a complete protein and a more desirable meal. Where figure labels include the same number but with an "a" or "b" in FIG. 4, these are meant to illustrate corresponding elements for different chambers of the multi-chamber apparatus.

In the multi-chamber apparatus of FIG. 4, the main container is replaced by two main containers that allow separate cooking. For example a standard main container can be removed and replaced by a similarly-sized container comprising two half-sized chambers, e.g. a left and a right chamber. The apparatus can be sold with optional single chamber or multiple chambers that can be snapped in and out of the apparatus by the user according to his cooking needs.

As one example, the left chamber 410a can have one ingredient 21a added, say dried beans, and the right chamber 410b can have another ingredient 21b, say dried rice. In this example, both chambers 410a and 410b might be thermally connected such that when the left chamber is heated the right chamber is also heated. However, prior to addition of liquid 20a to the right chamber via liquid source 17a, the rice will remain substantially unaltered as ordinary dried rice. However, by providing a liquid source controller 414 (equivalent to liquid valve 14 in general throughout this specification) that can controllably and selectively add liquid to only the left chamber, or only the right chamber, the left chamber can proceed to be used largely independently as a chamber for the soaking, sprouting, and/or cooking of beans. In many such cases, the beans and rice could both be added, and the beans substantially prepared in the left chamber while the rice will remain in its original uncooked state in the right chamber in spite of the water and heating applied to the left chamber. At the appropriate time, e.g. 0, 5, 10, 20, 30, 45, 60, 120, etc. minutes before the left chamber cooking is complete, or even after the left chamber cooking is complete, water can be controllably and automatically added to the right chamber, and the right chamber run through a cooking cycle to prepare the rice, such that both chambers produce a properly-cooked product at the same time.

In this example, sometimes the left and right chambers will substantially rely on the timing of the independent addition of liquid to each chamber, but common heating of both chambers, to achieve both sides being cooked properly. In other cases, additional heating elements can be provided such that a 'boost' of heating can be applied favorably to one side versus the other. In some cases, a single heating element is used to make manufacture of the invention cheaper and simpler. In other cases, two, three, or more heating elements are provided, including arrangements with one or more heaters dedicated to and proximal to (e.g. under, on the side of, in) each corresponding chamber. Examples of such elements are shown in FIG. 4 (e.g. 31, 31*a*, 31*b*, 31*c*, 31*d*), though other locations, additional or fewer elements are also possible. Asymmetric arrangements of any elements (e.g. their presence or absence, number, location, shape, in total or on a per-chamber basis), including heating elements, sensors, valves, etc. are to be considered as variants in general throughout embodiments of the invention. In still other cases, a main heating element is provided and shared between all chambers, with additional heating elements provided that are dedicated to each corresponding chamber. In some cases, the chambers are strongly thermally coupled, for example by having all chambers formed out of a single non-stick coated removable pot that is thermally conductive. In other embodiments, the chambers can be designed to isolate them thermally, for example by having an insulation barrier 411 between the two chambers. In some such cases, the principal body of the main container 10 can be formed out of a single body that is thermally conductive, but has a thermal insulation 411 barrier between the common wall(s) of the chambers to limit thermal conduction between the chambers.

In some embodiments, the chambers may be formed separately, for example as separate inserts or containers that allow the containers and the cooked ingredients to be removed individually. In some cases, more than one chamber will have a drain 11, possibly with an associated outlet cover 18, liquid tube 13, and/or liquid valve 12. In some cases, such valves 12 will be independently operable and controllable by the invention, e.g. to allow the chambers to be drained independently. In some cases, separate chambers will share a common valve 12 so that they are drained simultaneously, or so they can drain only one chamber at a time, e.g. be configured to allow liquid from only one chamber at a time to flow from that chamber. In some cases, only one of the chambers will have a drain and/or valve 12, such that some of the chambers may not be drainable. For example, beans commonly require flushing and draining when soaking, but it may be desirable to wash and drain rice before cooking. In some cases, rice can be cooked without a washing step and draining the liquid from the rice may be skipped. Omission of draining capacity from some chambers can be used to make a more affordable invention when appropriate.

Hence, the invention provides for one, two, three, four, five, or more main containers some or all of which may be independently or only jointly removable, all or some of which may be independently or only jointly heated, all or some of which may be independently or only-simultaneously drained, or have liquid added, or have liquid removed, or have a drain or be drainable, or not have a drain or not be drainable. Thus there can be multiple chambers, each one of which could be its own independent chamber with all available functions, sensors (e.g. 413*a*, 413*b*, 413*c*, 413*d*, 413*e*, 413*f*), and control, and In some cases, some chambers will be simpler with more limited functionality and only a subset of those options. In many embodiments, some or all of the functions, aims, and/or operation described for this invention apply to the individual main containers in a multi-chamber embodiment, e.g. individual chambers can be used for cooking, cooling, blanching, sprouting, steaming, maintaining, and all of the other uses described for a main container 10 of the invention.

The apparatus can also include "lunch pail" embodiments. The apparatus can comprise a sub-apparatus suitable for the transport, maintenance, and containment of the contents of the main container. For example, in some embodiments the main container 10, insulation layer 412, and possibly temperature sensing and reporting components can be detached from other components of main apparatus and portably moved as a durable, lightweight container suitable for food transport while containing the contents of the main container and maintaining the temperature within a temperature range. In some cases, it can report on the maintenance of the temperature range as described above.

In general, the components described for the single or multi-chamber apparatus embodiments are available in all such embodiments. Many of the elements shown are also optional, as one of ordinary skill will particularly appreciate from the large number of elements shown in FIG. 4. In multi-chamber embodiments, elements shown for one chamber may be present in all or only some chambers, and elements shown only in single- or multi-chamber embodiments may be used in multi- or single-chamber embodiments, respectively. For example, such embodiments may include one or all of a liquid source controller 414 analogous to an inlet valve 14, liquid source 17*a* and 17*b* analogous to inlet valve 17, gas outlets 16*a* and 16*b* analogous to gas outlet 16, sensors 413*a*, 413*b*, 413*c*, 413*d*, 413*e*, 413*f* analogous to sensors S1, S2, S3, S4, S5, S6, S7, S8, S9, main container 10 divided into main containers 410*a* and 410*b*, liquid 20*a* and 20*b* analogous to liquid 20, and food product 21*a* and 21*b* analogous to food product 20. In addition, these embodiments can include heating elements 31, 31*a*, 31*b*, 31*c*, 31*d*, thermal insulation 412 and other common-numbered elements between FIGS. 1, 2, 3, 4, 5, 6, 7 and other places where present, light source 420*a*, 420*b*, 420*c*, hinge 421 for having a lid 5 attached to outer container 37, seals 422*a*, 422*b*, 422*c* to prevent undesired fluid escape (e.g. gas, steam, liquid) between main container 10/410*a*/410*b* and lid 5, etc.

The apparatus can also include one or more transparent windows, ports, layers, materials, or other areas in the main container, lid, outer container, etc. Examples of these are shown in FIG. 4 as 421*a* and 421*b*. 421*a* illustrates, for example, allowing light or optical transmission from the interior of a chamber to sensors and/or light sources within the interior of the apparatus. 421*b* illustrates, for example, allowing light or optical transmission from the interior of a chamber to sensors and/or light sources including those outside of the apparatus. Though shown on the multi-chamber FIG. 4, the use of transparent materials exemplified here applies to the multiple places elsewhere in the specification that incorporate transparent materials.

III. Apparatus with Side Drain

Figure 5:
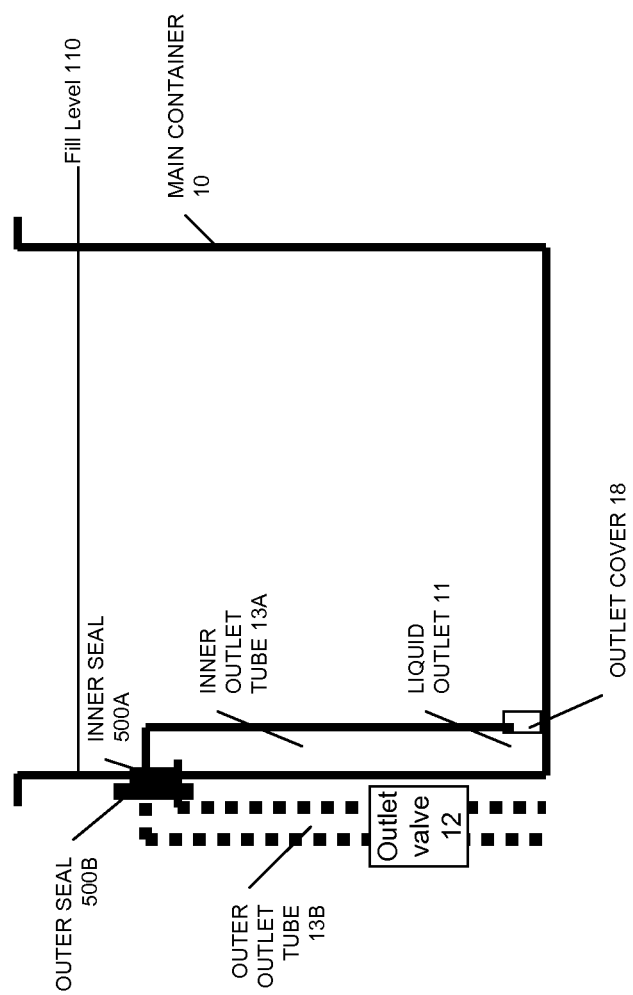
FIG. 5 is a cross-sectional view of the apparatus for liquid control with a side wall drain, according to embodiments of the invention.

Referring now to FIG. 5 there is shown an apparatus for liquid control that includes a side wall drain, according to one embodiment. In some embodiments, the liquid outlet 11 uses siphoning action with a tube or hose going up the side of the apparatus (e.g. inner outlet tube 13A and outer outlet tube 13B). As shown in FIG. 5, an inner seal 500A can be attached to the outlet tube 13A and/or to the main container 10, and/or an outer seal 500B can be attached to the outlet tube 13B and/or outer container 37. In such embodiments, one or more seals such as those mentioned are provided to maintain a fluid-tight seal sufficient to enable siphoning action. In this case, a pump may be included to provide the siphoning action, and the drain may be located on the side of the apparatus. In some embodiments, siphoning action includes filling the main container 10 to a fill 110 level sufficient to prime the siphoning line, possibly in conjunction with a valve (e.g., valve 14) that keeps the siphoning line primed after the liquid level is lowered. In some cases, either with or without a side drain or siphoning line, steam, a pump, or other pressure will be used to push a substantial portion of the liquid out of the main container. In some embodiments, siphoning will use a pre-primed siphoning line (e.g. 13A, 13B) to drain the main container 10. In some cases, the siphoning is substantially free of the use of pumping by the apparatus to drain the main container 10.

IV. Cleanability and Portability

Commonly, ease of use and cleaning are important considerations in implementing the invention. For example, in daily use in a home kitchen, cleaning is greatly facilitated by easy detachability, e.g. tool-free removal, of principal components comprising the main container(s) 10, 10a, 10b, outlet cover 18, all or part of outlet valve 12, and other surfaces in liquid and solid contact with the main container(s) during cooking. To enhance hygiene and enable cooking results independent of ingredients used for previous cooking sessions, users may want to clean the surfaces that contact the ingredients during the subsequent cooking sessions. This can be achieved by allowing those cooking surfaces to be detached from the invention for remote washing (e.g. in a standard home dish-washing appliance). Hence, in many embodiments the components of the invention comprising those surfaces will be detachable and remain substantially undamaged when submersed in water and washed with hand-dish soaps.

Many of the parts of the apparatus can be removed for cleaning either manually or for placement in a standard home dish-washing machine to maintain the hygienic state of the apparatus. In some embodiments, all parts that come into contact with the food product 21 can be removable. These various parts can be removed by hand, without requiring usage of a tool (e.g., hand-detachable parts that can be snapped in and out of the apparatus). The parts that are removable can include the main container 10, the liquid inlet container 34, the liquid outlet container 32, any or all of the tubes 38, 17, 33, 13, the valves 12, 14, and so forth. In some embodiments, the liquid inlet container 34 is attached to one or more of the tubes 38, 17 and valve 14, and the removal of the container 34 removes all of these parts for washing. In some embodiments, the liquid outlet container 32 is attached to one or more of the tubes 33, 13 and valve 12, and the removal of the container 32 removes all of these parts for washing. Further, in some embodiments, the main container 10 is attached to any or all of the tubes 38, 17, 33, 13, the valves 12, 14, and the removal of the container 10 removes some or all of these parts for washing. For example, the main container 10 could be pulled out of the top of the apparatus, and the tubes 13, 33 can be attached to the bottom of the container 10 and can all come out with the container 10 for washing. The tubes 13, 33 can slip out of the valve 12 (leaving the valve 12 behind), or the valve 12 can also come out with the main container 10. In this case, the tubes 13, 33 could be designed as default closed tubes, or the valve 12 can be set to a closed state to avoid spillage of liquid on removal of the main container 10. The outlet cover 18 (e.g., mesh) is also removable in some embodiments for separate cleaning.

The apparatus or its components can be designed for cleaning in household dishwashers, optionally with coatings resistant to damage from standard dish washing detergents. For example, seals can be made with silicone, dishwasher-resistant plastics, ceramics, rubbers, etc. Components can also be sized to fit inside a standard home dish washing machine, including in the size dimensions described above. Convenient surfaces/coatings/finishes may include FEP (fluorinated ethylene propylene), PFTE (polytetrafluoroethylene or Teflon), non-stick coatings, glass, stainless steel, silicone, heat-resistant rubbers and coatings, aluminum, chromium, enamel, anodized, iron, and other cooking or washable surfaces known in the relevant arts. Some users feel certain surface coatings, such as Teflon or nonstick, should only be hand washed, others wash those surfaces in a machine with standard detergents as a matter of choice. The coatings can further include standard coatings for kitchen pots, pans, dishware, and the food-contact surfaces of cooking appliances.

In some embodiments, the weight of each removable component will be suitable for easy detachability, washability, and ergonomic home use, e.g. with a weight not more than 15 pounds, 12 pounds, 10 pounds, 8 pounds, 5 pounds, 4 pounds, 3 pounds, 2 pounds, 1 pound, or 0.5 pounds. The components can be possibly larger or smaller as appropriate for the component, but in many cases preferably using the standard weight (or lighter) for home-use kitchen pots and pans. Detaching and washing many components on a regular basis can be inconvenient. Thus, the number of components that need to be detached for washing in order to wash all surfaces in liquid/solid contact with the food during cooking will be limited (e.g., 6, 5, 4, 3, 2, or 1, though possibly more for some embodiments incorporating extra features or complex arrangements). Notably, however, some components do not contact the cooking food but will also be made to be easily removable (e.g., seasonings containers).

It is especially desirable to allow for easy cleaning between uses of components (e.g., one or more main containers and liquid outlets) that are immediately in contact with the food during cooking. These can collect food residues and/or potentially grow bacteria between uses of the device. Hence, those components that contact the ingredients during cooking, i.e. those components that are contacting the ingredients 21, 21a, 21b in a main container or the liquids on the main-chamber side of the outlet valve components 18 and 11 can be easily washable. In many cases, the most convenient way to allow that is for them to be easily detached for washing by hand in the sink or for being washed in a standard dish-washing machine already found in most home kitchens.

Other components, for example seasonings containers holding dry ingredients, outlet valves 16, 16a, 16b, chamber lids 5, etc., may be in steam contact with the food during all or part of cooking, but possibly not in solid or liquid contact with those components. Those components may not need cleaning as often, and hence it may be less critical for those to be easily detached for cleaning separate from the device.

In practical uses, "detachable" means easily removed from the device without resorting to general-purpose tools, including crescent wrenches, socket wrenches, screwdrivers, hammers, pliers, etc., and also means easily re-installed without those tools, and being designed for reinstallation without recommending the use of consumables including new seals, gaskets, o-rings, greases, caulks, etc., as part of the standard removal procedure. The detachable components can generally be quick and easy for a home user to remove from the apparatus and carry them elsewhere for cleaning and washing. In other words, detachable components are generally designed so that they can be easily removed by hand from the invention after each use, easily carried by a single home user to a standard home-kitchen washing place in the same, submerged and washed by hand and/or in a home dish-washing machine without substantially impairing their subsequent usability, and reattached to the invention without adding any consumables that ensure a good seal between the liquid-handling components. This cook-remove-wash-replace-cook cycle can be repeated many times.

Moreover, "detachable" generally means that a detachable component can be quickly removed from the apparatus by a single user without rushing, e.g. in 5 minutes, 4 minutes, 3 minutes, 2 minutes, 1 minute, 30 seconds, 20 seconds, 10 seconds, 5 seconds, or 1 second, though less or more may be appropriate according to the embodiment. Thus, detachable is substantially different and readily distinguished from components that are removable by any means.

Components so designed to be detachable will commonly include the main container 10 and all components in liquid or solid contact with ingredients in the main container 10 during the cooking cycle. When present, such components will commonly include an outlet cover 18, liquid tube 13, and surfaces of valve 12 in contact with the liquid that touches the food during the cooking cycle, possibly including part of or the entire valve mechanism 12. In some embodiments, the apparatus may incorporate a flushing or self-cleaning cycle. In these cases, some components may not require removal for cleaning between cooking sessions. For example, the main container 10 may generally still be detachable for easy separate washing away from the apparatus, while other components that are in liquid but not solid contact with the food, e.g. the valve 12, may not be detachable.

In one embodiment, the apparatus has a cleaning cycle. For example, the apparatus can have a clean cycle button or other mechanism to allow the user to control the cleaning of the apparatus. In this cycle, the device can be designed to move around hot water through the main container 10 and any of the other parts of the apparatus that may come into contact with food (e.g., the tubes, valves, lid, etc.). In some embodiments, the apparatus can be dry-heated to a sterilizing temperature, filled with sterilizing steam, or the water can be brought to a boil for sterilizing the inside of the apparatus. For example, the apparatus can add liquid to the main container 10, heat the liquid using, e.g., heater 31, and the boiling water plus generated steam will sterilize the interior of the main container and surfaces that would normally be in liquid or solid contact with the contents of the main container 10. Flushing this water and steam through valves and tubes can be used to sterilize and/or clean them, too.

Further, in some embodiments, soap can be inserted (e.g., into any of containers 10, 32, 34 or into a special hatch or opening in the apparatus for soap insertion), and the soap plus water can be moved around inside the apparatus in the cleaning cycle. In embodiments including the cleaning cycle, one or more of the parts of the apparatus (e.g., main container 10, tubes 13, 17, 33, 38, valves 12, 14) can be designed to tolerate high heat. The apparatus can also be designed to dump its contents into a sink or into a kitchen garbage disposal unit (e.g., with a tube that could be snapped onto the apparatus) during the cleaning cycle.

The apparatus can be designed to be portable or movable by the user. In some embodiments, the apparatus is light enough or small enough for a single person to move it to different locations (e.g., from counter to cupboard and back). The device can be designed to minimize the device footprint or counter/shelf-space in a kitchen. It can be powered for use with standard household outlets and can follow appliance guidelines for standard household use. In some cases, the apparatus may incorporate portable power, such as solar cells and/or batteries to maintain partial- or full-functionality with intermittent or no connectivity to external power sources for an extended period of time. Physical design can also be adjusted for storage, portability, and placement. In some embodiments, the fresh water container may have the largest volume to hold the soaking water, the cooking water and any rinsing water. The cooking container (main container) may be next in size to be able to hold the food product and the soaking water. The smallest container is the drain container that may only have the capacity to hold the soaking water excess, the liquid that the food product has not absorbed, and any rinsing water. In some embodiments, the three containers can be fully or partially disassembled and stored inside each other, e.g., to facilitate both transport and storage. In this way, the invention's footprint can be minimized to save counter space, e.g., by making it taller rather than increasing its footprint.

V. Input Reagents or Seasonings

Referring now to FIGS. 6a, 6b, 6c, 6d, there are shown multiple exemplary embodiments of seasonings containers 650a-d for usage with the apparatuses and methods described herein. Multiple tubes, valves, chambers, electromagnetically, thermally, or mechanically controllable openings, and/or mechanisms may be added to allow input reagents to be kept separate before adding to the main container or liquid/fresh water container under desired conditions or at desired times. For example, in addition to water, some embodiments may allow for sauces, oil, broth, seasonings, or other flavoring agents to be added separately. This may be achieved, for example, by one or more sources of input reagents, including flavoring agents, flatulence reducers or preparation enhancers, sterilizing chemicals, and so forth. Several examples are shown in FIGS. 6a, 6b, 6c, 6d, and described herein.

A cup or chamber or repository ("seasonings holder" 600) can be included, where liquid or dry seasonings or other reagents ("seasonings" 601) can be added and then released into the main container 10 or into the fresh water/liquid inlet container 34. That release could be by simply opening a hatch on the seasonings holder 600 to expose it to the main container 10, where gravity, dropping, sliding, heat resulting in release or viscosity change, melting, steam, condensation, capillary action, washing, or combinations of these or other mechanisms, etc. can transfer the seasonings 601 into the main container 10. In some embodiments, opening a mechanical hatch, flap, door, or lid 603 can drop or slide the seasonings 601 into the main container 10, (e.g. a "trap door" mechanism).

In some embodiments the seasonings holder 600 would be designed such that exposing the seasonings holder 600 to the main container 10 achieved appropriate transfer of seasonings 601. For example, steam or steam condensation could be enough to dissolve, liquefy, melt, or solvate seasonings 600 and thereby allow them to flow into the main container 10. Similarly, seasonings 600 can be formulated such that they are solid or viscous at room temperature and humidity, but liquefy or gasify on exposure to the main container 10 and thereby flow or release into the main container 10. For example, a chamber placed in the lid 5 could allow seasonings 601 to be added to a seasonings holder 600, then a flap or closure or lid 604 could be closed to isolate the seasonings 601 from the outside environment and keep the seasonings 600 at ready for use, and later the invention could open a second flap or closure or lid 603 to expose the seasonings 601 to the main container 10 container and thus transfer seasonings 601 into the main container 10 at the appropriate point in the cooking process. Salt, for example could be placed in the seasonings holder 600 and added late in the final cooking step, for example, to facilitate full flavor when cooking food products like beans in order to achieve desired flavor without causing tough skins on the beans. Chili and hot spices that the operator wanted to penetrate vegetables or beans could be added to the seasonings holder 600 and then controllably exposed to the main container 10 earlier in the cooking process, thereby transferring the spices to beans, vegetables, etc. for a longer time in order to soak them deeply into the food. Baking soda or Beano could be added to the seasonings holder 600 and then exposed to the main container 10 during a pre-rinse-soak step to neutralize flatulence-inducing nutrients, and in this way baking soda could achieve its affect and yet be substantially eliminated in a rinsing cycle in order to achieve a desired final product (e.g. neutralize flatulence-inducing nutrients while minimizing impact on final flavor). Cycles, such as season-rinse cycles, can be repeated 1, 2, 3, 4, 5, 6, 8, 10 or more times or in partial cycles to increase, decrease, or adjust the strength or effect of the application of the seasonings.

Like all surfaces of the invention, in some cases, specific surfaces in the seasonings holder 600 will be intentionally coated with surface coatings in order to facilitate cleaning, decrease adherence or sticking of ingredients, and/or facilitate transfer of materials. Hydrophobic coatings, for example, may be applied to keep charged or hydrophilic materials from sticking to the surface. For example, a Teflon or other hydrophobic nonstick coating may be applied to keep salt, baking soda, dry reagents, seasoning liquids, etc. from sticking to the seasonings container. In some cases, the coating will be designed to enhance the full transfer of the seasonings 601 to the main container 10, such that the amount of residual seasonings left behind is minimized, thus facilitating cleaning and better controlling the period when the fresh seasonings 601 are transferred to the main container 10. In some cases, a hydrophilic coating will be used, for example for a seasonings holder 600 that will be used to transfer hot oils, seasoning oils, and other hydrophilic agents. Of course, one of ordinary skill will appreciate that low-stiction coatings can be sufficient to achieve the desired effect in some cases, for example the non-stick properties of Teflon-like coatings can work well with efficient transfer or removal even of hydrophobic oils, fats, butters, greases, etc. because there is low adherence between materials and the coated surfaces.

The seasonings holder 600 can be fully or partially removable for loading, cleaning, and or distribution. For example, the seasonings holder 600 may be a removable insert placed in the lid 5 of the invention that can be placed in a dishwasher for easy cleaning. In other cases, the seasonings holder 600 can be integrated into the main chamber 10 container itself, e.g. as cup, pocket, or indentation into the wall of the main container. In some cases, that integrated seasonings holder will have a door, flap, or other controllable opening or lid 603 that opens at a pre-determined temperature or pressure. In other cases, the controllable opening 603 will be mechanically opened by a latch, hook, pull, spring, or other standard mechanical method controlled by the invention. Preferably, in some embodiments the seasonings holder 600 will be opened by means of an electromagnet that does not require a physical connection to the inside of the main container. For example, an electromagnet can be integrated in the apparatus and positioned near the main container 10, and activated to release a flap or opening of the seasonings holder 600. In some embodiments, one or more spice containers will comprise a spring-loaded door with a latch released by an electromagnet, and in some further embodiments the door or container is designed to be loaded by hand, e.g., before cooking starts. In general, such a spring/magnet mechanism, a motor, a slider, a valve, and many other means well known in the appliance arts may be used to implement lid opening mechanisms 613 and 614. Moreover, such mechanisms are understood to be present in some or all embodiments (e.g., FIGS. 6a, 6b, 6c, 6d, and others described in this text) even though for simplicity they are not shown in all figures.

In some cases, the seasonings holder 600 can be a pre-filled canister, packet, or single-use container ("seasonings package" 602) that can be used to add a pre-determined mixture of seasonings. For example, in some embodiments, the seasoning package 602 is sealed prior to use, and is punctured by the apparatus, e.g. by inlet 605 and outlet 606 with good fluid-tight seal achieved by optional seals 610 and/or 611, to allow fluid flow into and out of the package, wherein such fluid flow is sufficient to transport the seasonings with the fluid flow into the main container. In some cases, the seasonings are delivered by controllably flowing liquid through the seasonings holder 600 at the desired time or in recipe conditions when the time is right to add some or all of the seasonings 601 to the main container 10. For example, the main water source can have a controllable valve or pump that diverts water through the seasonings holder 600 via inlet 605 and dissolves or mechanically flushes the seasonings holders' contents into the main container. Commonly, containers (seasonings packages 602) of pre-mixed liquids or seasonings may be added to a main container by the flow of a carrier liquid, such as water, to flush them into the main container from a holding chamber/cup or pre-prepared reagent container. Reagents, such as salt or salt-water, baking powder or baking-powder infused water, vinegar, and other reagents known to aide in food preparation, can be kept separately from the main cooking or rinsing water. Although seasonings 601 and seasonings 602 are singly or both described in specific embodiments, one of ordinary skill will appreciate that in the described cases and in general all seasonings 601 may be contained in a seasonings package 602. In other cases unpackaged seasonings 601 and one or more seasonings packages 602 containing other seasonings 601 will be used. In further cases the seasonings package 602 is optional and only an unpackaged form of seasonings 601 will be present. In some cases, only seasonings 601 are present. In other cases a seasonings package 602 is present; or both are present. Even in cases where both are shown, it is understood either may be absent. In some cases, the seasonings or seasonings package will be liquid, paste, powder, infusible materials like tea, coffee, saffron, or bay leaves, etc. In some cases, the seasonings will be frozen and melting may be used in introducing the seasonings to the main container. In some cases, the seasonings will be reusable, e.g., introduced as a concentrate or reservoir to dose only some of the seasonings into the main container during execution of a recipe.

In some cases, multiple seasonings holders 600 will be used. In that way, seasonings that need to be added at different times or conditions, or seasonings that need different types of containers or seasonings holders 600 for practical handling reasons (e.g. dry spices that mix poorly with liquid seasoning oils) will be used. In such cases, the invention incorporates appropriate mechanisms, such as a multi-way or multi-port valve, such as valve 14 connected by a tube or channel to inlet 605, for controlling which seasonings holder 600 and/or seasonings package 602 is flushed with liquid. Multiple magnets or mechanical controllers can be included that allow the seasonings holders 600 to be opened or closed independently, e.g., by controlling the opening and/or closing of lids 600 and/or 601, by controlling flow through inlet 605 and/or outlet 606, etc. Moreover, different coatings will be applied to all or some of the components of seasonings delivery systems depending on the physical characteristics of the seasonings to be loaded in the respective seasonings holder, the operating conditions, etc. In some cases, one or more seals 607 will be used to insure that the mechanisms controlling access to the seasonings holder 600 will have a liquid, solid, or gas tight seal, particularly on the side of the seasonings holder 600 directly in contact with the main container 10. In some embodiments, the inlet 605 and/or outlet 606 will either or both have a bushing 610 to insure a tight seal for fluids entering and/or exiting a seasonings package 602. In many embodiments, the outlet 606 or inlet 605 will be regulated by one or more control valves 608 (implied in all figures even when not shown).

In general, the presence, amount, temperature, viscosity, opacity, color, chemical properties, density, pH, conductivity, weight, 'chemical tongue' taste, capacitance, liquid level, humidity, pressure, code, barcode, chemical or electronic signatures, inner and/or outer lid state including positions of full/partial/in-between open/closed states, and other properties of the seasonings holder, seasonings, seasoning package, inlet, outlet, inner lid, outer lid, main container, and/or any other of the elements in FIGS. 6a, 6b, 6c, 6d, and other figures that can be sensed by sensors 612a-1, or other sensors inside or near seasonings holder 600, can be used in operation of the invention. In some embodiments, the sensors can be used to sense some or all of the following: the presence or level or type of seasonings present in the seasonings holder and/or seasonings package, the rate of inflow of liquid or outflow of liquid or seasonings, the freshness, expiration date, or vendor of the seasonings or seasonings container, to confirm if an inner or outer lid is open or closed partially or fully, to determine if the seasonings or seasonings package present is in accordance with a recipe to be performed by the invention, or to determine a recipe to be performed based on a machine-readable label 620, e.g. a RFID tag, signature, barcode, datamatrix code, semacode, data glyph, code, tag, other machine-readable label, or other measurement of the seasonings or seasonings package, etc.

VI. Sprouting, Steaming, Blanching

The apparatus can be designed to allow sprouting of some foods, such as for sprouting of beans. Moisture, warmth, and in most cases, indirect or artificial sunlight may be needed for sprouting. Some sprouts, such as mung beans, can be grown in the dark. Various different kinds of foods can be sprouted, including but not limited to mung beans, chickpeas, alfalfa, barley, green peas, clover, dill, pinto beans, cilantro, snow peas, pigeon peas, anise seed, amaranth, cabbage, caragana, arugula, adzuki bean, lima bean, navy bean, fennel, fenugreek, chia seed, lentils, watercress, pearl millet, leek, kale, quinoa, rye, radish, spelt, triticale, chickpeas, canola seed, almond, brown rice, tatsoi, peanut, onion, oats, chives, mustard, psyllium sesame, pumpkin, celery, annatto seed, buckwheat, wheat berries, basil, broccoli, cauliflower, garlic, flax seed, hemp seed, lupins, kamut, mizuna, kat, coriander, black-eyed peas, dhania, and soybean sunflower. In some embodiments, the sprouting process may comprise growth of plants in general. Barley can also be sprouted as a part of the malting process (e.g., malted barley in beer). The food to be sprouted can be placed directly into the main container 10 or into one or more removable baskets placed in the main container.

The apparatus can include a sprouting cycle or setting that allows the user to set the apparatus to sprout the food product 21. The user can set the apparatus to sprout for a specified period of time (e.g., 1 day, 2 days, 3 days, etc.). The user can also set the apparatus to sprout for a set period of time and then automatically begin cooking after that period of time. The apparatus can also include an autocook feature that begins to cook the food product 21 that being sprouted after a certain period of time, in case the cook has accidentally left the food sprouting for too long (to avoid spoilage). The apparatus, e.g., using an autocook feature, can be set to sprout to a particular stage of sprouting, with the stage being detected by the sensors and microcontroller analysis of sensor data (for stages or measurements in sprouting, see the references incorporated herein previously in this specification).

The apparatus can be designed to allow the food product to receive light for sprouting. In one embodiment, the lid 5 of the main container 10 is composed of a material that is transparent or otherwise allows light to pass through to the food product 21 inside. In another embodiment, the apparatus includes a removable lid 5 over a cover for the main container 10 that is made of a material that is transparent or otherwise allows light to reach the food product 21. In still another embodiment, the outer container 37 and main container 10 are made of a material that is transparent or otherwise allows light to pass through to the food product 21. In a further embodiment, the apparatus includes a light inside (e.g., a growing light, or light that simulates sunlight, for example one or more LED or fluorescent lights with spectrum chosen to enhance growth or sprouting) that provides light to the food product 21 during sprouting. Light sources can be included in different locations and layouts. In some embodiments, light sources are incorporated into the walls lid, or bottom of the apparatus (e.g. one or more LEDs can be incorporated in the lid, or lights shine up through a transparent section in the bottom and/or sidewalls of the chamber. In some cases, the light can be provided by multiple sources arranged in a pattern to deliver evenly distributed light. For example, a ring or point source, or a transparent window can be present in the lid, and a light source can be attached to the lid (e.g., using a fluorescent "grow light" ring or tube, or one or more LEDs). The main container 10 can be fully transparent or contain a transparent window to allow light to enter, e.g., through a light source as described above, etc.

The apparatus can be designed to allow for air circulation during the sprouting process, so that the apparatus is sometimes sealed but sometimes allows air inside (e.g., via a gas outlet or other mechanism). For example, the gas outlet 16, 36 can be used to allow air to enter the apparatus during the sprouting process. Similarly, the apparatus can include air pumps, vents, or other mechanism to pump air into the apparatus or to circulate air.

The apparatus can also be used to provide moisture for sprouting. For example, water can be occasionally squirted, misted, dripped, sprayed, or delivered as described above/below into the main container 10 from the liquid inlet container 34 as needed to avoid evaporation and keep the food at the right moisture level for sprouting. Where the food product to be sprouted should be only partially covered with liquid, the apparatus can ensure that this partial cover is maintained throughout the sprouting process by adding or removing water as needed without requiring any intervention by the user. In many such cases, excess water is removed through the drain valve, possibly with the drain valve controlled to release the excess water in conjunction with a component to sense or calculate the water level and determine that excess water should be removed in accordance with the current recipe (e.g., the sprouting recipe).

The apparatus can further include an agitator to mechanically agitate or shake the main container or the floor of the main container. For example, the base of the main container, or the entire main container, can be designed to allow shaking (e.g., by including a motor near the main container that permits movement of the container or some parts of the container). Similarly, the agitator can include an agitating component inside the main container either attached to or separate from the container for causing movement or stirring inside the container. For example, the apparatus can include a magnet in the main container and a magnetic stir bar or other stirring mechanism inside the main container. The agitating component can also be a mechanical stirring arm inside the main container. The agitator can be used to shake the food, or to cause a slight movement to adjust the positioning of the food. Similarly, the agitator can be used to move the liquid or moisture inside of the main container to allow liquid circulation. In this manner, the food product or liquid in the container is prevented from becoming stagnant. Similarly, repositioning of the food can move the food or plant that is sprouting to allow for additional aeration to improve sprouting or can allow different sides of the food to receive light. In addition, the agitator can be used in any of the other cycles, such as the cooking, rinsing, soaking, washing, apparatus cleaning, etc. For example, the agitator can move the food product around during cooking to allow for even distribution, or to provide a stirring motion. As another example, the agitator can also be used to agitate the liquid and soap inside the main container for improved cleaning by sloshing around the cleaning fluid.

The apparatus can also be used to provide warming or temperature management for the food product 21, including for sprouting. For some food products, the sprouting process is enhanced by slight warming of the food product above room temperature (e.g., to between 13 and 21 degrees Celsius, or some other temperature range). In this case, the heater 31 can be turned on/off, turned up/down, or can be used to increase, decrease, or maintain the heat inside the main container 10 as needed. The temperature can be maintained at a constant level or varied over time according to instructions provided by the microcontroller or settings entered by the user. In one embodiment, the apparatus includes a cooling component that can be used to cool the main container 10, including even cooling below room temperature to slow or halt the sprouting of the food. Similarly, the apparatus can in some embodiments automatically switch to a cooling or refrigeration cycle to keep the sprouts cool once sprouting is complete, thus avoiding spoilage of the food until the user is ready to cook the food. One or more of the "heating" elements may comprise or consist of a cooling mechanism, such as a refrigeration unit, a Peltier device, a heat sink, a water cooled or air cooled system, etc., or a combination of such devices.

The apparatus can be further designed to control the environmental conditions inside, including the pressure, temperature, humidity, etc. to maintain the appropriate or optimal sprouting conditions (e.g., via the microcontroller, via one or both of the valves 12, 14, via the gas outlet, etc.). Each food item can have its own ideal sprouting conditions or sprouting times, which the apparatus can maintain via readings with sensors in the apparatus and by control through the microcontroller. As explained above, the apparatus can have pre-arranged settings or downloadable settings/recipes for different foods that can including sprouting conditions, or the user can manually enter this data. Where the user has indicated a particular food to be sprouted (e.g., buckwheat), the apparatus can use these settings/recipes to apply the appropriate conditions (temperature, air circulation, lighting, humidity, etc.) inside the apparatus for that food to be sprouted.

Sprouting of certain food products 21 is known to provide health benefits. Sprouts are rich in energy, vitamins, minerals, proteins, amino acids, enzymes, phytochemicals, etc. Sprouting/germinating causes the changes in the food due to breaking down of certain compounds into a more simple form for digestion, and breaking down less desirable components. Sprouting can cause an increase in plant enzyme content, in crude fiber and crude protein content, in vitamin and essential fatty acid content, in protein quality, etc. The hydration and soaking of seeds increases metabolic activity of those seeds and causes biochemical changes in which compounds such as starches, proteins, lipids, etc. are broken down into simple compounds, thus improving the overall nutritional content of the food. (see e.g., Wigmore 1986, Myerowitz 1998, Brauenstein 1999, already incorporated above for all purposes).

The apparatus can also be designed for blanching, steaming or sterilizing food. For example, there can be separate settings or buttons of the device for these functions. The blanching function can be designed to do a quick boil or to quickly run hot water against the food product 21. For example, for vegetables, this could be designed to cook in a manner that does not penetrate the vegetables all the way through so that they are still crunchy, but cooked out the outside. The user may also be able to regulate the timing to manage the blanching and control the level cooking to be performed on the food.

The vegetables or other food item can be placed directly inside the main container 10 for blanching or steaming, or there can be one or more insertable baskets inside the main container 10 in which the food to be blanched or steamed can be placed. Where the food is placed into the main container 10, the apparatus can be set to squirt in a little liquid, allow it to steam/blanch a little, squirt in some more liquid, allow more steaming/blanching, and so forth until the desired cooking level is reached.

VII. Methods

Sprouting Method

Figure 7:
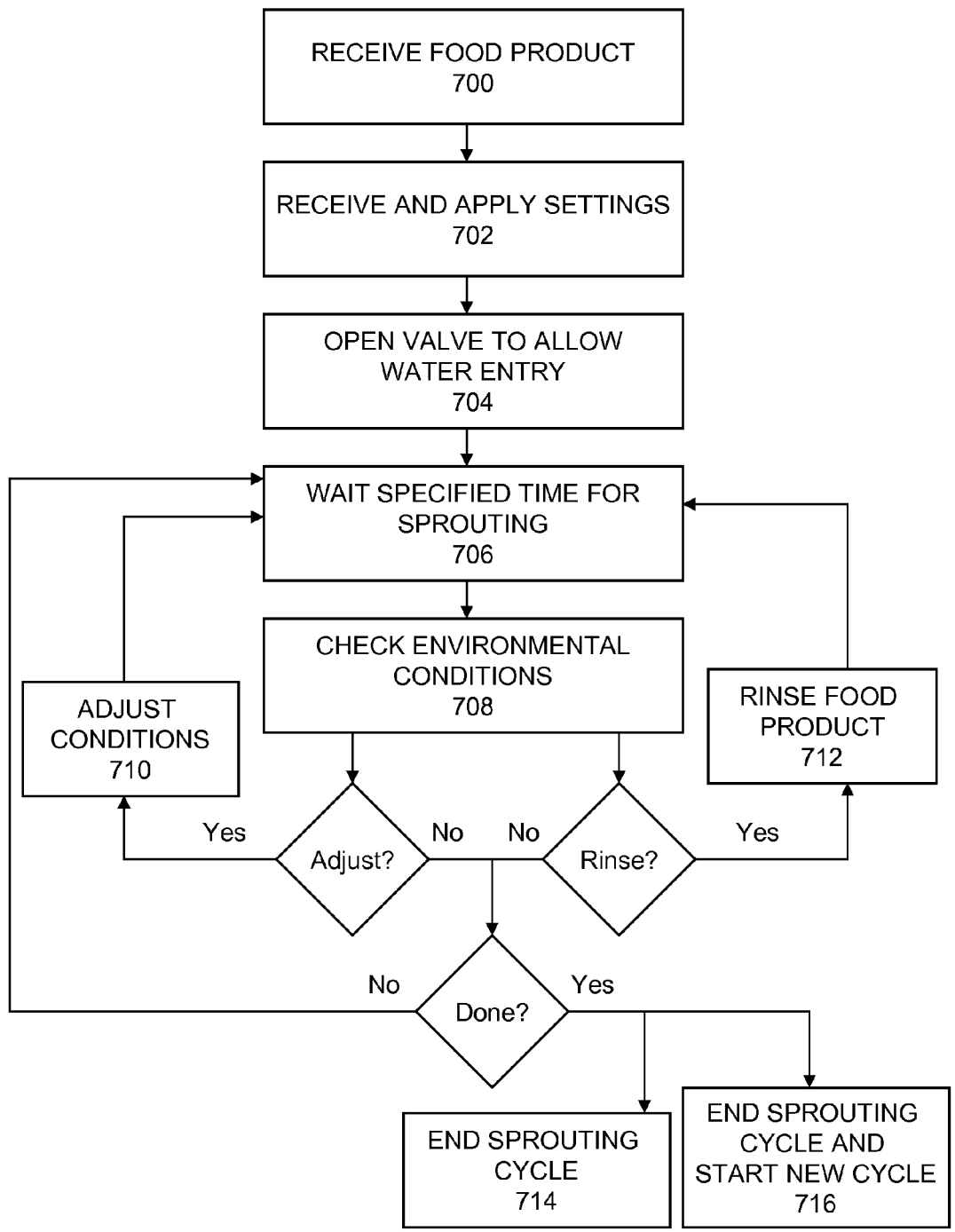
FIG. 7 is a flowchart illustrating steps performed for sprouting a food product in the apparatus, according to embodiments of the invention.

Referring now to FIG. 7 there is shown a flowchart illustrating the sprouting operation of the apparatus, according to some embodiments of the invention. It should be understood that these steps are illustrative only. Different embodiments of the apparatus may perform the illustrated steps in different orders, omit certain steps, and/or perform additional steps not shown in FIG. 7 (the same is true for the other figures).

As shown in FIG. 7, the method for sprouting includes receiving 700 of the food into the apparatus. The food can be inserted by opening the lid 5 (where present) on the main container 10, removing the liquid inlet container 34 (if present), inserting the food through a hatch on top, side, bottom of the apparatus, and so forth. The method also includes receiving and applying the settings 702 of the apparatus cycle (e.g., for a sprouting cycle, for a particular time period, for a particular food type, for a particular recipe, etc.). Where a washing cycle (described regarding FIG. 8) was performed before the sprouting cycle, the food may already have been received 700 and/or the settings already received 702, so it may only be necessary to begin the next cycle. The method further includes opening or operation 704 of the valve 14 to allow a specified amount water (e.g., amount specified by the apparatus, by a recipe, by the controller, entered by the user, etc.) from the inlet container 34 to enter into the main container. The food is then moistened in the main container 10. In some embodiments, the liquid may be sprayed or spritzed on the food to moisten for sprouting.

The method includes then waiting 706 a specified amount of time (e.g., specified according to completion of a criterion, such as a recipe completion, when the sensors indicate sprouting is complete, a fixed time period, etc.) for the food to sprout in the main container 10. The waiting time may be controlled according to a recipe (i.e. a machine readable recipe), such as a specification to wait a specific length of time, e.g., for 5 hours, 12, hours, 1 day, until 5 pm, etc., or as instructions to wait until sensors and the microcontroller detect that a particular sprouting stage has occurred. An imaging sensor or match of other sensor conditions that indicate sprouting has occurred may control the waiting time. The apparatus may wait, e.g., until initial sprouting is observed, or until longer sprouts such as 0.5 cm, 1 cm, 2 cm, 3 cm, 4 cm, or more or less, are observed by imaging sensors. Stages and measurements of sprouting are described in the previously incorporated references. Occasionally, the apparatus checks 708 whether any environmental conditions need to be adjusted 710 for the sprouting process. For example, the temperature, humidity, pressure, amount of air, air circulation, lighting, etc. can be checked 708. If any of these parameters needs adjustment, the method includes adjusting 710 of those parameters. To adjust 710 amount of air or air circulation, the gas outlet 16, 36 could be opened or air can otherwise be let into the main container 10, or a pump or air circulator can be used to move air around. To adjust 710 lighting conditions, a light inside the apparatus can be turned on, turned up, dimmed, etc. To adjust 710 the temperature, the heater 31 can be turned on, turned up, or turned down. To adjust 710 the pressure, the gas outlet 16, 36 or valves 12, 14 can be opened or closed or operated as needed. To adjust 710 the humidity or moisture, one or both of the valves 12, 14 can be opened to allow liquid to enter or leave the main container 10. Each of these parameters can be monitored by sensors S1-S8 or other sensors in the apparatus that are in communication with the microcontroller, providing feedback about the environmental conditions inside the main container 10, and allowing the microcontroller to determine what adjustments should be made. By maintaining the environmental conditions, the apparatus is designed to automatically avoid (without user intervention) many or all of the common causes for sprouts to become inedible, including drying out, being left in standing water, having insufficient air flow, being too warm or cold, having insufficient rinsing, being contaminated, etc.

The method can include occasionally rinsing 712 the sprouting food by changing the liquid inside the main container 10. Sprouts that sit in water too long will begin to rot, thus the water may need to be occasionally drained to let the food dry a little and/or replaced with fresh water to re-moisten. Sprouts can be rinsed 712 at regular intervals (e.g., once, twice, three, four times a day, etc.) or as needed based on sensor readings, e.g., according to a recipe. In addition, rapid or pressured flushing of water can be used to provide a bit of agitation to move the food product around for aeration and to adjust food positioning. Once the sprouting process is determined to be finished, the method can include ending 714 the sprouting cycle without further action, or the method can include ending and then starting 716 a new cycle (e.g., recipe or step within a recipe) automatically. Depending on what food type is used, after one to five days, the food will have sprouted sufficiently (e.g., two or three inches in length) to be suitable for consumption. Users can sprout more or less as desired (e.g., more sprouting, such as for five to ten days, can lead to development of baby leaves/baby greens).

Washing/Rinsing Method

Figure 8:
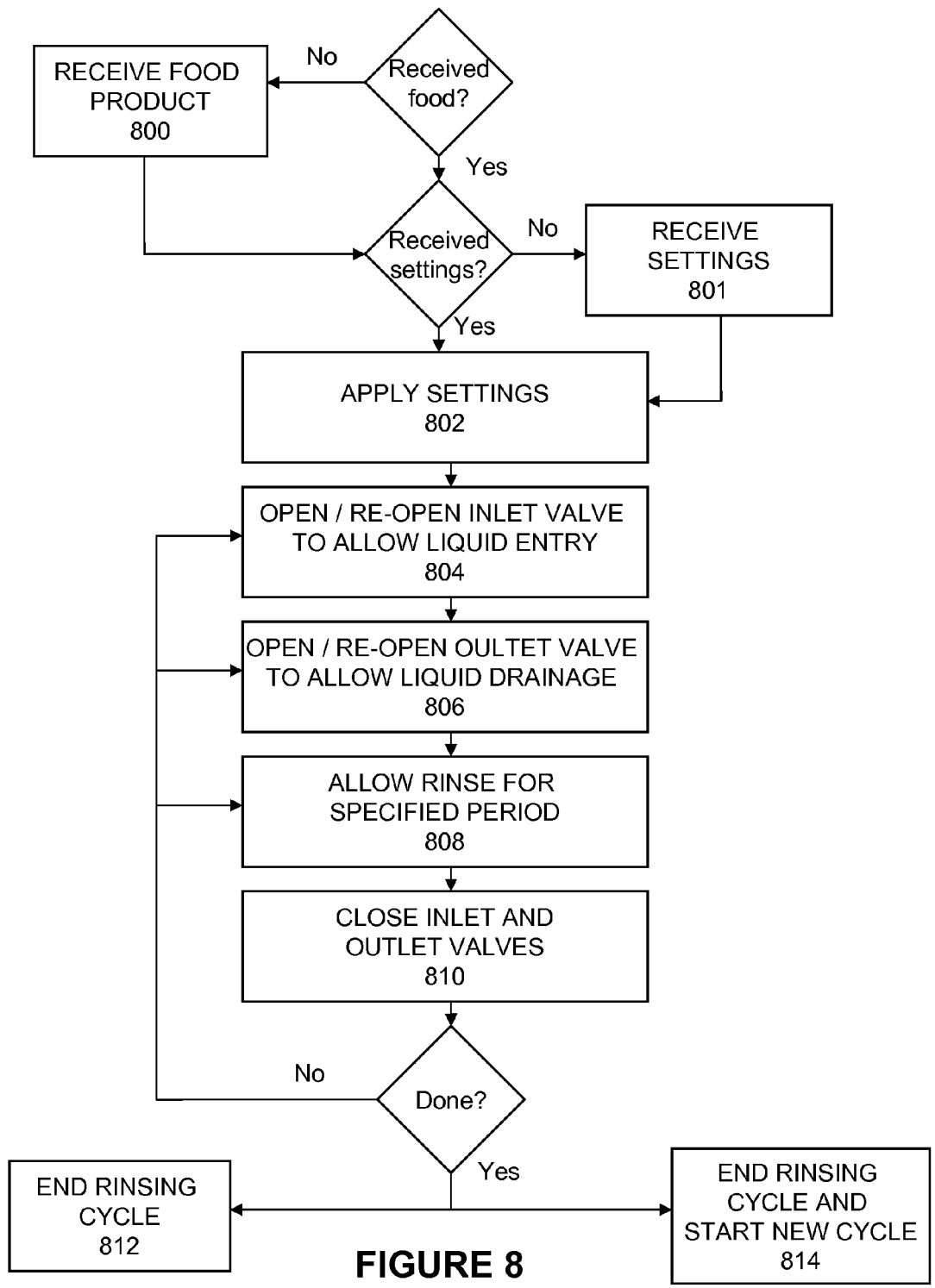
FIG. 8 is a flowchart illustrating steps performed for rinsing or washing a food product in the apparatus, according to embodiments of the invention.

Referring now to FIG. 8, there is shown a flowchart illustrating the food washing/rinsing operation of the apparatus, according to some embodiments of the invention. If food has not already been received into the apparatus, the method includes receiving 800 of the food product into the apparatus (e.g., in the manners described above regarding FIG. 7). Where sprouting or another step was first conducted, the food may already be in the apparatus. In that case the method includes receiving 801 the settings of the apparatus cycle, if the settings have not already been received. For example, the user can enter into the display or user interface particular settings that include information about what steps the apparatus should perform. The apparatus can thus receive 801 settings for a washing/rinsing cycle, for a particular time period, for a particular food type, for a particular recipe, etc. Once received, the apparatus can then apply 802 these settings (e.g., the microcontroller can start turning on or off components, starting opening or closing valves, start applying the requirements associated with a particular recipe entered, etc.). Where a sprouting or other cycle was performed before the washing cycle, the settings may have already been received 801. For example, the user might have entered into the user interface instructions telling the apparatus to conduct both a sprouting and washing/rinsing cycle. In this case, the apparatus can automatically apply 802 those setting that were received originally by the user. Thus, the apparatus can launch into the next cycle (in this case, rinsing/washing) automatically, without requiring any further user input at the time of starting the new cycle.

The method further includes operating or opening 804 of the inlet valve 14 to allow a specified amount water (e.g., amount specified by the apparatus, by a recipe, by the controller, entered by the user, etc.) from the inlet container 34 to enter into the main container. The method also includes opening 806 of the outlet valve 12 to let the water leave the main container 10. The two valves 12, 14 can be opened simultaneously to allow constant flow of water, or the inlet valve 14 can be opened first to fully/partially fill the main container 10 and then the outlet valve 12 opened to drain the liquid. The apparatus can keep these valves 12, 14 open/operating for a period of time and can allow 808 the rinsing process to continue for the specified period of time (e.g., specified according to completion of a criterion, such as a recipe completion, when the sensors indicate washing is complete, a fixed time period, etc.) and then can close 810 one or both of the valves 12, 14. The valves 12, 14 can be closed simultaneously or not (e.g., inlet valve 14 closes first to stop liquid entry, and then outlet valve 12 closes second to finish drainage). In some embodiments, the apparatus can both open and close the valves multiple times during the rinsing process (e.g., open inlet valve for liquid entry and then close it, open outlet valve for liquid drainage and then close, and then repeat). In some embodiments, the user sets the amount of time for rinsing or number of rinses or wash cycles that should be performed.

The apparatus can also have a default wash/rinse process with a pre-set amount of time or number of rinses to be performed. If the process is not yet done, the apparatus can allow 808 the rinsing to continue for longer (or start a new rinse), or the apparatus can re-open 804, 806 the valves to allow fresh water to rinse through again and close 810 them again.

When the specified amount of water has been flushed through the main container 10, and the washing cycle is done, the inlet valve 14 can be closed 808 to prevent further water entry, and the outlet valve 12 can be closed 810. The outlet valve 12 may be closed 810 simultaneously with the closing 808 of the inlet valve (e.g., to keep some liquid in the main container 10) or may be closed after (e.g., after the water has drained from the main container 10 to leave it empty). Once the washing/rinsing process is determined to be finished, the method can include ending 812 the washing/rinsing cycle without further action, or the method can include ending and then starting 814 a new cycle (e.g., cooking, sprouting, steaming, blanching, etc.) automatically.

Soaking Method

Figure 9:
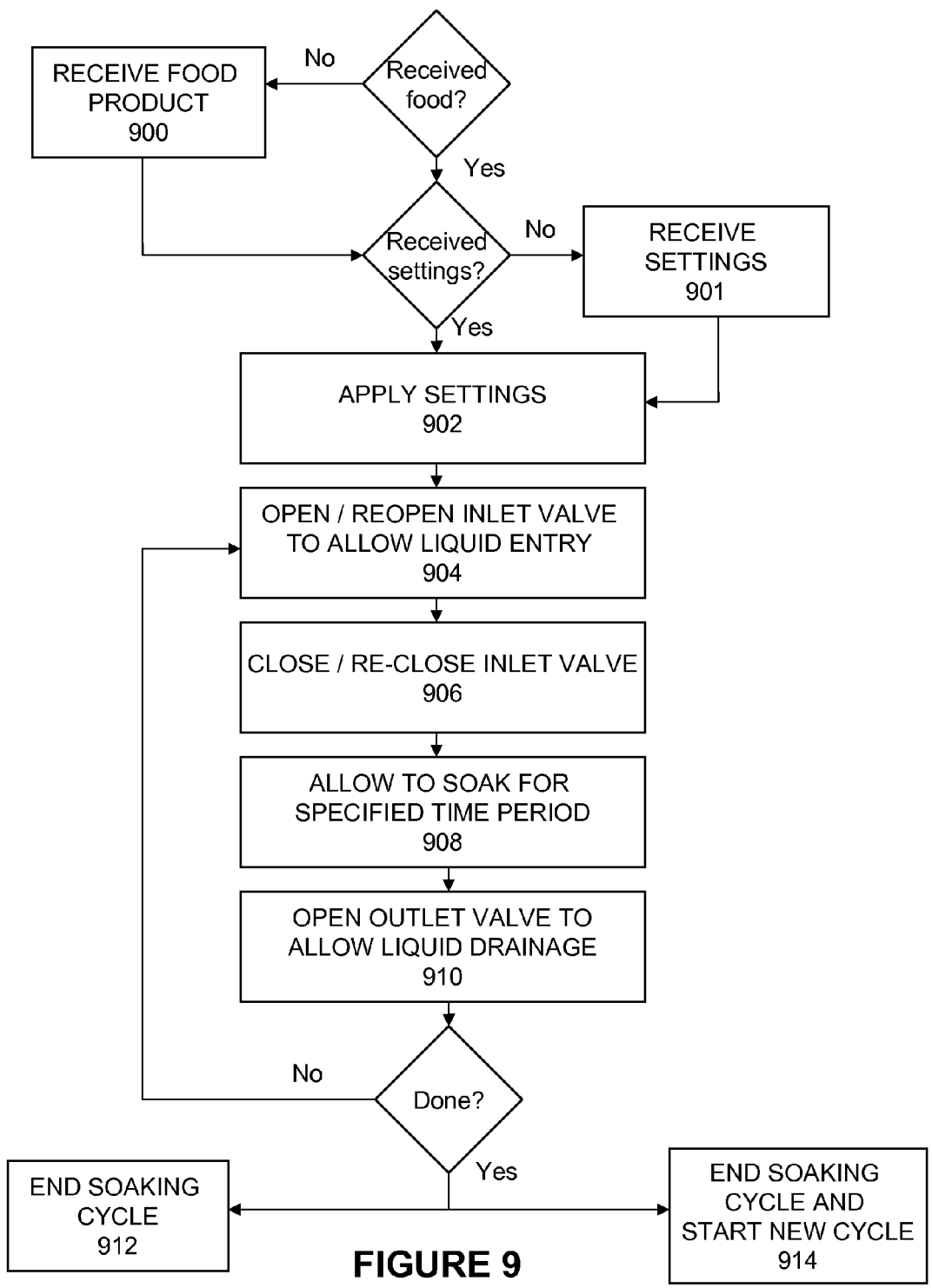
FIG. 9 is a flowchart illustrating steps performed for soaking a food product in the apparatus, according to embodiments of the invention.

Referring now to FIG. 9, there is shown a flowchart illustrating the food soaking operation of the apparatus, according to some embodiments of the invention. If food has not already been received into the apparatus, the method includes receiving 900 of the food product into the apparatus (e.g., in the manners described above regarding FIG. 7). Where sprouting, rinsing, or another step was first conducted, the food may already be in the apparatus. In that case the method includes receiving 901 (e.g., entered by the user into the user interface of the apparatus) the settings of the apparatus cycle (e.g., for a soaking cycle, for a particular time period, for a particular food type, for a particular recipe, etc.), if the settings have not already been received. Once received, the apparatus can then apply 902 these settings (e.g., the microcontroller can start turning on or off components, starting opening or closing valves, start applying the requirements associated with a particular recipe entered, etc.). Where another cycle was performed before the soaking cycle, the settings may have already been received 901 (e.g., settings for two or more cycles entered at once). In this case, the apparatus can automatically apply 902 those setting that were received originally by the user (e.g., automatically starting the next cycle without requiring further user input).

The method further opening 904 the inlet valve to allow a specified amount liquid (e.g., amount specified by the apparatus, by a recipe, by the controller, entered by the user, etc.) from the inlet container 34 to enter into the main container where the food is located. The outlet valve 12 should be in the closed position to prevent liquid drainage (or may be open briefly to allow some liquid to pass through, and then closed). The method also includes closing 906 of the inlet valve 14 to stop the liquid entering into the container. The liquid sits in the main container with the food, and can be allowed 908 to soak for a specified period of time (e.g., specified according to completion of a criterion, such as a recipe completion, when the sensors indicate soaking is done, a fixed time period, etc.). In some embodiments, the user sets the amount of time for soaking or number of soak cycles that should be performed. The apparatus can also have a default soak process with a pre-set amount of time or number of soaks to be performed. The method also includes opening 910 the outlet valve to allow liquid drainage at the end of the period of time during which the food was allowed 908 to soak. If the process is not yet done, the apparatus can allow 908 the soaking to continue for longer, or the apparatus can close the outlet valve and re-open 804 the inlet valve to allow another soaking cycle with fresh water, which can be allowed 908 to sit for a period of time before the outlet valve 910 is re-opened to drain again.

These soaking cycles can be repeated multiple times if desired before the process is complete, e.g. 1, 2, 3, 4, 5 or more times. For example, more or longer soaking cycles could be used to reduce flatulence associated with beans. With more cycles, shorter cycles can also be used to more readily reduce flatulence and/or improve total soaking time or regulate soaking effects. Once the soaking process is determined to be finished, the method can include ending 912 the soaking cycle without further action, or the method can include ending and then starting 914 a new cycle (e.g., cooking, sprouting, steaming, blanching, etc.) automatically.

Cooking Method

Figure 10:
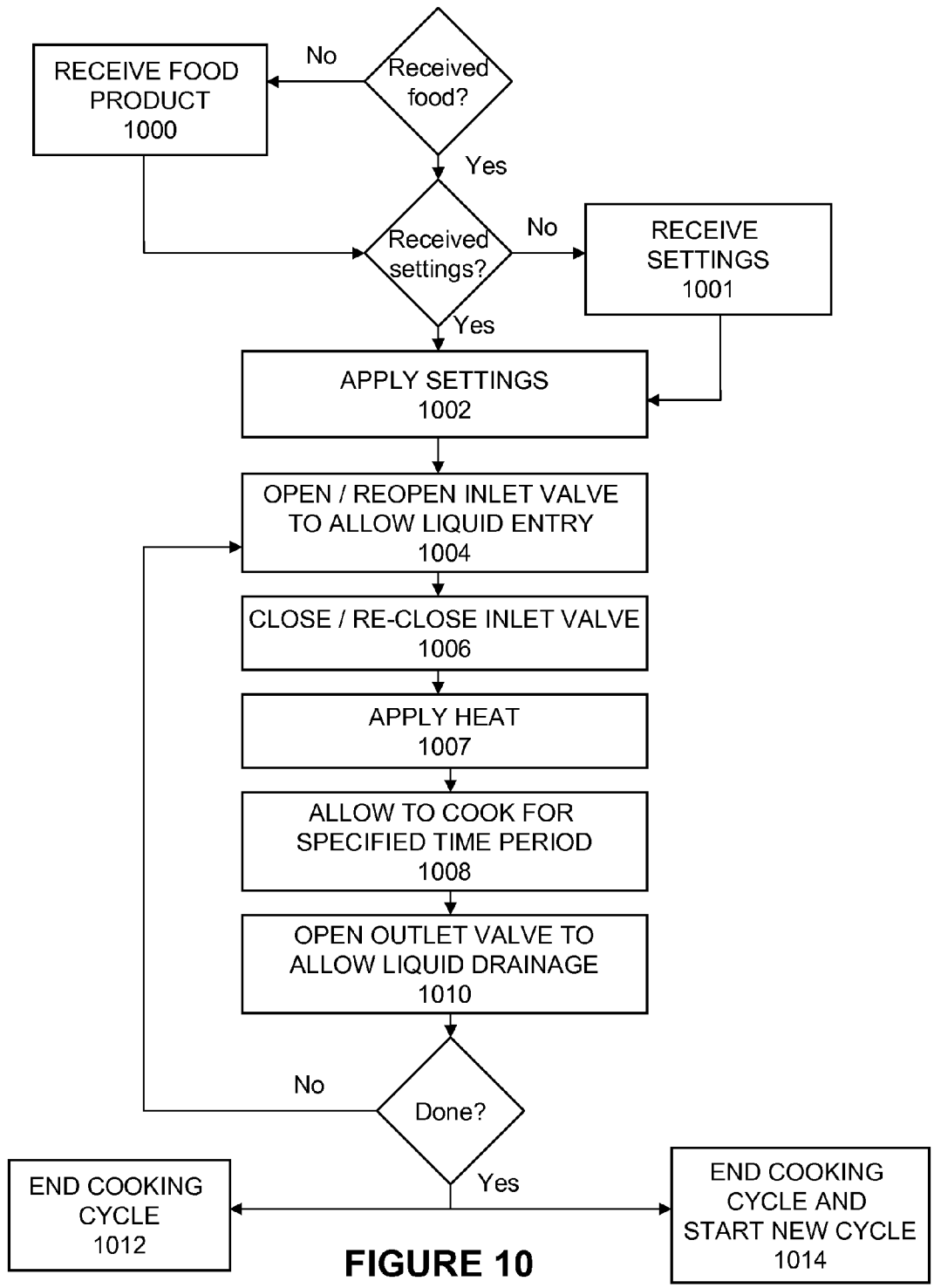
FIG. 10 is a flowchart illustrating steps performed for cooking a food product in the apparatus, according to embodiments of the invention.
Figure 11:
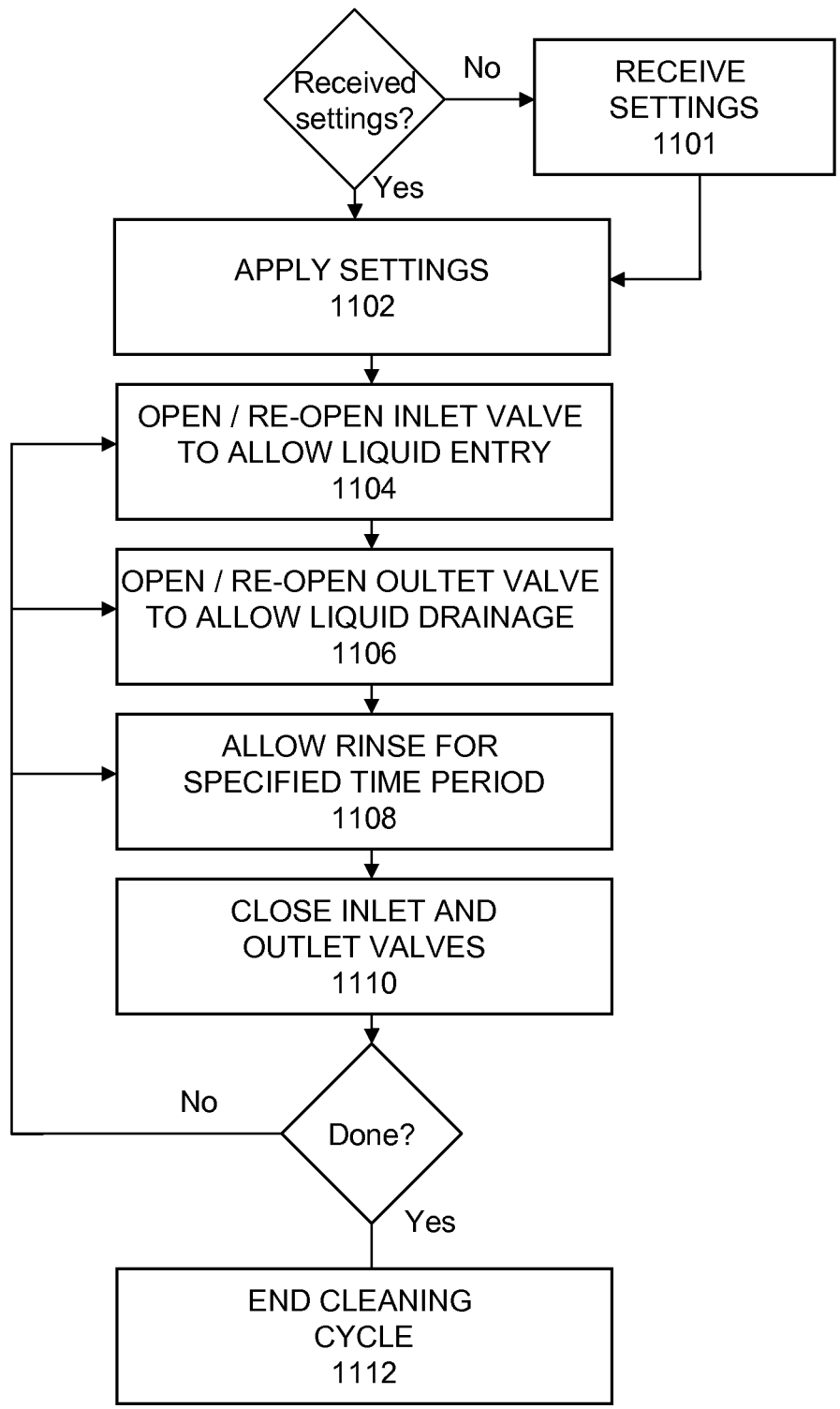
FIG. 11 is a flowchart illustrating steps performed for automatically cleaning the apparatus, according to embodiments of the invention.

Referring now to FIG. 10, there is shown a flowchart illustrating the food cooking operation of the apparatus, according to some embodiments of the invention. If food has not already been received into the apparatus, the method includes receiving 1000 of the food product into the apparatus (e.g., in the manners described above regarding FIG. 7). Where sprouting, rinsing, soaking, or another step was first conducted, the food may already be in the apparatus. In that case the method includes receiving 1001 (e.g., entered by the user into the user interface of the apparatus) the settings of the apparatus cycle (e.g., for a cooking cycle, for a particular time period, for a particular food type, for a particular recipe, etc.), if the settings have not already been received. Once received, the apparatus can then apply 1002 these settings (e.g., the microcontroller can start turning on or off components, starting opening or closing valves, start applying the requirements associated with a particular recipe entered, etc.). Where another cycle was performed before the cooking cycle, the settings may have already been received 1001 (e.g., settings for two or more cycles entered at once). In this case, the apparatus can automatically apply 1002 those setting that were received originally by the user (e.g., automatically starting the next cycle without requiring further user input).

The method further opening 1004 the inlet valve to allow a specified amount liquid (e.g., the amount needed to cook the particular food or food type, the amount needed to perform the particular cooking process, etc.) from the inlet container 34 to enter into the main container where the food is located. The outlet valve 12 should be in the closed position to prevent liquid drainage (or may be open briefly to allow some liquid to pass through, and then closed). The method also includes closing 1006 of the inlet valve 14 to stop the liquid entering into the container. Heat can also be applied 1007 to the main container for cooking. The liquid sits in the main container with the food, and can be allowed 1008 to cook for a specified period of time (e.g., as set by the user, as set by a default setting, as determined by instructions on a recipe applied by the microcontroller specified according to completion of a criterion, such as a recipe completion, when the sensors indicate done-ness, a fixed time period, etc.). During this cooking time, a variety of processes can be performed, including turning up or down the heat, letting in air or out steam, adding more liquid to the container or draining liquid, and so forth. The sensors described above can ensure that the appropriate conditions are maintained for cooking the food in the container, and where adjustments need to be made, the microcontroller can control the making of those changes.

The method also includes opening 1010 the outlet valve to allow liquid drainage at the end of the period of time during which the food was allowed 1008 to cook. If the process is not yet done, the apparatus can allow 1008 the cooking to continue for longer, or the apparatus can close the outlet valve and re-open 1004 the inlet valve to allow another cooking cycle with fresh water, which can be allowed 1008 to sit for a period of time before the outlet valve 1010 is re-opened to drain again. These cooking cycles can be repeated multiple times if desired before the process is complete. Once the cooking process is determined to be finished, the method can include ending 1012 the cooking cycle without further action, or the method can include ending and then starting 1014 a new cycle (e.g., cleaning, etc.) automatically.

In some embodiments, the above-described cooking process can involve entirely immersing the food product in liquid for a period of time. For example, when cooking rice or beans, the dry rice/beans can be entirely immersed in a specified amount liquid (e.g., amount specified by the apparatus, by a recipe, by the controller, entered by the user, etc.) and allowed to sit with heat applied for a period of time. Certain foods may require higher or lower temperatures, more or less liquid, more or less time, etc.

Where the cooking process to be performed is a blanching process, the food is typically placed in boiling water and removed or cooled after a brief time period. This might also be followed by the food being placed into cold water to halt the cooking processes. The blanching process also generally uses the steps of FIG. 9, including the opening/closing 1004, 1006, 1010 of valves, heating 1007, allowing 1008 of the food to cook, etc. However, in this case, a smaller amount of liquid may be applied and/or the food may be left sitting in the liquid for a smaller period of time. The liquid might also be preheated to a temperature that it is boiling or near boiling before entering the main container. For example, the water could be heated separately in a compartment in the lid 5 of the apparatus, before entering the main container with the food (or the apparatus could be connected to a faucet to provide hot water). As another example, where the apparatus contains two containers for cooking food, the water could be heated in one container, while the food sits in unheated in the other container. A spout, hatch, or other mechanism between the two containers can be opened at the appropriate time to allow entry of the boiling liquid into the container holding the food. As still another example, the apparatus could have a rapid-heat mechanism. In this case, room-temperature liquid could be added to the container with the food, and the heater of the apparatus can be used to very quickly bring the liquid to a boil, and the liquid can then be promptly drained. To apply cool or cold water to the food as another blanching step, the inlet valve can be opened to allow room-temperature water to enter into the main container (or can be connected to a faucet to provide cool water) and then be drained. Similarly, the apparatus can have a cooling mechanism to refrigerate or cool the water (e.g., as described in the heating examples, with a cooling mechanism in the lid, in one container of the two container device, with a rapid cool mechanism, etc.), which can be drained when finished.

Where the cooking process to be performed is a steaming process, including partial steaming or steam blanching (e.g., to a controlled depth of penetration) or sterilizing or surface sterilizing, the food is typically allowed to sit in a small amount of hot or boiling water, without being immersed, so the food is cooked by the steam created in the container. The steaming process also generally uses the steps of FIG. 9, including the opening/closing 1004, 1006, 1010 of valves, heating 1007, allowing 1008 of the food to cook, etc. The food may be directly in the main container or in a basket above the main container (e.g., above other food cooking in the main container). Where the food is in the main container, the cooking process can include allowing a small amount of water to enter the container with the food, heating this water to the appropriate temperature for steaming, allowing the food to steam, and then draining the liquid. Where the food is in a basket above cooking food in the main container, the steaming process occurs while the other food is cooking, so there may be no additional steps to the steaming. During the various steaming processes, the gas outlet can be used to trap steam or allow air to exit the container as needed.

The apparatus can also be used for pressure cooking using the cooking process of FIG. 9, which involves cooking in a sealed vessel that does not permit air or liquids to escape below a preset pressure. Since the boiling point of water increases as pressure increases, pressure is built up inside the cooker that allows the liquid in the pot to rise to a higher temperature before boiling. Since the apparatus is a sealed vessel with a liquid drain and gas outlet, the liquid/gas can be controlled and pressure can be allowed to build up for pressure cooking.

Various other cooking methods can be performed as well, generally using the steps of FIG. 9. The apparatus can also be used as a slow cooker, for cooking food for long lengths of time without requiring user action or manipulation during the cooking. Similarly, the apparatus can be used for braising for foods that need a longer cooking time to become tender (e.g., root vegetables, meats, etc.). The food can be browned in the main container with heat, and then liquid (e.g., oil, broth, water, etc.) can added to allow the food to simmer in covered conditions. Also, the apparatus can be used to broil or stew food, where foods are cooked in hot liquids over a period of time creating a broth or sauce that can also be served with the food. Similarly, other cooking processes can be performed in the apparatus, including stir frying, roasting, baking, barbequing, etc. The device can also be used to prepare a variety of foods that require controlled movement of water, a controlled environment, etc. For example, the device can be used for making yogurt by maintaining the level of liquid and maintaining the environment conditions. The device can further be used for preparing al dente pasta by ensuring that the boiling water is removed from the device at the right time to ensure the proper tenderness of the pasta. There can be different settings for different pasta types that all the pasta to boil longer for some pasta (e.g., for rigatoni) and shorter for other pasta (e.g., cappelini). The device can also be used to singe foods or slightly burn foods (e.g., creating a layer of singed, crunchy rice at the bottom of the container).

Cleaning Method

Referring now to FIG. 13, there is shown a flowchart illustrating the food cleaning operation of the apparatus, according to some embodiments of the invention. As explained above, the apparatus can be cleaned manually by the user by taking the removable parts out and washing by hand or in a dishwasher. The apparatus can also include an automatic cleaning process illustrated in FIG. 13. In the FIG. 13 embodiment, the method includes receiving 1100 (e.g., entered by a user) and applying 1102 the cleaning setting. If the setting was received in advance (e.g., set to auto-clean on a timer at a particular time, set to auto-clean once the food is removed, etc.), the method includes applying 1102 these settings.

The method further includes opening 1104 of the inlet valve 14 to allow a specified amount water (e.g., amount specified by the apparatus, by a cleaning cycle requirement, by the controller, entered by the user, etc.) from the inlet container 34 to enter into the main container. The method also includes opening 1106 of the outlet valve 12 to let the water leave the main container 10. The two valves 12, 14 can be opened simultaneously to allow constant flow of water, or the inlet valve 14 can be opened and then the outlet valve 12. The apparatus can keep these valves 12, 14 open for a period of time and can allow 1108 the cleaning process to continue for the specified period of time (e.g., specified according to completion of a criterion, such as a cleaning completion, when the sensors indicate the apparatus is clean, a fixed time period, etc.) and then can close 1110 one or both of the valves 12, 14. The valves 12, 14 can be closed simultaneously or not. In some embodiments, the apparatus can both open and close the valves multiple times during the cleaning process to add fresh water regularly. Soap can also be added for cleaning. In some embodiments, the user adds soap into the main container or inlet container. In some embodiments, the apparatus contains a soap container or hatch into which soap can be added. For example, a seasonings container or similar device may be used for cleaning, e.g. to store chemicals or soap, possibly using sensors to determine the level, state, or identity of materials in the container much like is possible with food seasonings or seasonings packages. The microcontroller can also be designed to open the soap hatch at the appropriate time to add soap to the main container. There can be a default cleaning process or the user can set the amount of time for cleaning or number of clean cycles that should be performed. If the process is not yet done, e.g. as determined by sensors and/or microcontroller of the apparatus, the apparatus can allow 1108 the cleaning to continue for longer or the apparatus can re-open 1104, 1106 the valves to allow fresh water to rinse through again and close 1110 them again.

When the specified amount of water has been flushed through the main container 10, and the cleaning cycle is done, the inlet valve 14 can be closed 1108 to prevent further water entry, and the outlet valve 12 can be closed 1110. The outlet valve 12 may be closed 1110 simultaneously with the closing 08 of the inlet valve or may be closed after. Once the washing/rinsing process is determined to be finished, the method can include ending 1112 the cleaning cycle.

In addition to all of the advantages described elsewhere in this application, the advantages of the invention include, without limitation, convenient control of fresh liquid (and of waste liquid) in a main cooking container, including the ability to controllably add fresh water and drain water, to provide controllable levels of heat (and to cool, in some embodiments), to manage gas or steam in the container, to maintain and control environmental conditions, etc. This control allows for automated washing and soaking of a food product 21 prior to cooking, all in one chamber. Hence, as a portable, cleanable, compact kitchen appliance, the apparatus allows the user to load liquid 20 and food product 21 into the appliance and, without further work, the user can expect a properly cooked food product 21 in the end. The operations of rinsing, soaking, cooking, cleaning, among others can automatically take place inside the appliance. Similarly, other operations can occur inside the apparatus, such as sprouting, blanching, steaming, and so forth. The apparatus can perform controlled movement of liquid in and out of a main container through the use of multiple valves.

Steps of sprouting, rinsing, soaking, cooking, blanching, steaming, sterilizing, cleaning can be performed without user intervention, and can be performed in a chain without user intervention. For example, the user can insert dry food, and the apparatus can sprout, rinse, soak, and then cook that food. The user can return after a set time period (e.g., hours or days) to a fully cooked and prepared food item, or in some cases, to a fully prepared meal (e.g., where multiple chambers allow cooking of beans, rice, vegetables, etc. at the same time). The applying of settings, e.g. 702, 802, 902, 1002, or 1102, may be occur throughout or at any point in the corresponding processes.

The apparatus is designed to be able to prepare fresh foods, so the food is typically healthier. For example, the user can control the ingredients of the food prepared, so user can control salt content (for persons with high blood pressure), sugar content (for diabetics), gluten content (for persons with celiac disease), etc. The user can ensure that only whole grains are used, that the meal is completely organic, can limit the processing of the food, can minimize or limit the chemical contained or the preservatives used (a problem in canned foods), can prevent addition of ingredients that could cause allergic reactions, and can even sprout certain foods to increase the health benefits.

The apparatus can also be designed to be energy efficient, so that it uses as little power as possible. In areas of the world where intermittent power is available throughout the day, the apparatus can be set to cook the food product 21 whenever power is available, and to rest when power is not. Similarly, the apparatus can be set to cook when power is at the lowest price (e.g., as pre-set into the apparatus for certain countries or as manually set by the user). The device can further be solar powered or can use pre-heated water.

The above description is included to illustrate the operation of the embodiments and is not meant to limit the scope of the invention. The scope of the invention is to be limited only by the following claims. From the above discussion, many variations will be apparent to one skilled in the relevant art that would yet be encompassed by the spirit and scope of the invention. As used herein any reference to "one embodiment" or "an embodiment" means that a particular element, feature, structure, or characteristic described in connection with the embodiment is included in at least one embodiment. The appearances of the phrase "in one embodiment" or "in some embodiments" in various places in the specification are not necessarily all referring to the same embodiment. Numerous specific details have been set forth herein to provide a thorough understanding of the embodiments, though the embodiments may be practiced without these specific details.

We claim:

1. A portable apparatus for preparing and cooking a food product, the apparatus comprising:
   a main container for holding the food product;
   a liquid inlet opening into the main container for controllably providing liquid into the main container with the food product;
   an inlet valve connected to the liquid inlet for automated regulation of inflow of the liquid into the main container;
   a liquid outlet opening from the main container for controllably removing liquid from the main container without removing the food product;
   an outlet valve connected to the liquid outlet for automated regulation of outflow of the liquid from the main container;
   a heater associated with the main container for automated heating of the food product and the liquid in the main container;
   a controller in communication with the main container for automatically regulating the inflow of liquid into the main container, the outflow of the liquid from the main container, and the heating of the food product and the liquid by the heater;
   one or more seasonings containers attached to the main container configured to contain a seasonings package; and
   a sensor associated with the seasonings container for reading a code on the seasonings package and for automatically communicating information read from the code to the controller, the code containing data about usage of one or more seasonings in the seasonings package, wherein the controller adjusts one or more parameters of the apparatus based on the information from the sensor read from the code on the seasonings package, the controller configured to open or close the inlet valve or the outlet valve for liquid delivery to or removal from the main container, the controller further configured deliver one or more seasonings from the main container according to a recipe.

2. The apparatus of claim 1, further comprising an outlet cover positioned over the liquid outlet for allowing liquid to drain out of the main container without allowing the food product to pass through the liquid outlet.

3. The apparatus of claim 1, further comprising an inlet container attached to the inlet valve of the main container for containing the liquid provided to the main container through the inlet valve, and-an outlet container attached to the outlet valve of the main container for receiving and containing the liquid drained from the main container through the outlet valve.

4. The apparatus of claim 1, further comprising an outer container and a lid surrounding the main container for providing thermal insulation to the main container, wherein one of the lid or the outer container includes a gas outlet for releasing gases formed in the main container.

5. The apparatus of claim 1, wherein substantially all of the parts of the apparatus in solid or liquid contact with the food are detachable from the apparatus for removal and cleaning in a household dishwasher.

6. The apparatus of claim 1, further comprising one or more sensors arranged on the apparatus to measure a plurality of parameters inside the main container, wherein the parameters comprise a type of food and an eatability or cooking status of the food product in the main container.

7. The apparatus of claim 1, further comprising one or more seasonings containers attached to the main container for providing seasonings to the food product inside the main container, wherein the one or more seasonings containers comprise an openable hatch having an opening that leads to the main container for releasing the seasonings inside the seasonings container and into the main container.

8. The apparatus of claim 1, further comprising one or more seasonings containers attached to the main container for providing seasonings to the food product inside the main container, wherein the seasonings container is designed to hold a seasonings package containing the seasonings, and the apparatus further comprises a code-reading sensor proximal to the seasonings container for sensing contents of a seasoning container or for reading a code associated with the seasonings package inside the seasoning container.

9. The apparatus of claim 1, further comprising one or more seasonings containers attached to the main container for providing seasonings to the food product inside the main container, wherein the controller is further configured for controlling an opening or closing of the one or more seasonings containers according to a recipe to provide one or more seasonings to the food product.

10. A portable apparatus for preparing and cooking a food product, the apparatus comprising:
    a main container for holding the food product;
    a liquid inlet opening into the main container for controllably providing liquid into the main container with the food product;
    an inlet valve connected to the liquid inlet for automated regulation of inflow of the liquid into the main container;
    a liquid outlet opening from the main container for controllably removing liquid from the main container without removing the food product;
    an outlet valve connected to the liquid outlet for automated regulation of outflow of the liquid from the main container;
    a heater associated with the main container for automated heating of the food product and the liquid in the main container;
    a controller in communication with the main container for automatically regulating the inflow of liquid into the main container, the outflow of the liquid from the main container, and the heating of the food product and the liquid by the heater;
    a second main container for holding a second food product;
    a second liquid inlet opening into the second main container for providing liquid into the second main container with the second food product; and
    a second inlet valve connected to the second liquid inlet for automated regulation of inflow of the liquid into the second main container,
    wherein the heater is associated with the main container and the second main container for automated heating of the first and second food products and the liquid, and wherein the controller is in communication with the main container and second main container for regulating the inflow of liquid into the containers, the outflow of the liquid from containers, and the heating of the food products and the liquid by the heater.

11. The apparatus of claim 10, wherein the main container has a first seasonings container and the second container has a second seasonings container, and the first seasonings container and second seasonings container are independently controllable to independently release seasonings into the first container and the second container.

12. The apparatus of claim 10, further comprising an outlet cover positioned over the liquid outlet for allowing liquid to drain out of the main container without allowing the food product to pass through the liquid outlet.

13. The apparatus of claim 10, further comprising an inlet container attached to the inlet valve of the main container for containing the liquid provided to the main container through the inlet valve, and-an outlet container attached to the outlet valve of the main container for receiving and containing the liquid drained from the main container through the outlet valve.

14. The apparatus of claim 10, further comprising an outer container and a lid surrounding the main container for providing thermal insulation to the main container, wherein one of the lid or the outer container includes a gas outlet for releasing gases formed in the main container.

15. The apparatus of claim 10, wherein substantially all of the parts of the apparatus in solid or liquid contact with the food are detachable from the apparatus for removal and cleaning in a household dishwasher.

16. The apparatus of claim 10, further comprising one or more sensors arranged on the apparatus to measure a plurality of parameters inside the main container, wherein the parameters comprise a type of food and an eatability or cooking status of the food product in the main container.

17. The apparatus of claim 10, further comprising one or more seasonings containers attached to the main container for providing seasonings to the food product inside the main container, wherein the one or more seasonings containers comprise an openable hatch having an opening that leads to the main container for releasing the seasonings inside the seasonings container and into the main container.

18. The apparatus of claim 10, further comprising one or more seasonings containers attached to the main container for providing seasonings to the food product inside the main container, wherein the seasonings container is designed to hold a seasonings package containing the seasonings, and the apparatus further comprises a code-reading sensor proximal to the seasonings container for sensing contents of a seasoning container or for reading a code associated with the seasonings package inside the seasoning container.

19. The apparatus of claim 10, further comprising one or more seasonings containers attached to the main container for providing seasonings to the food product inside the main container, wherein the controller is further configured for controlling an opening or closing of the one or more seasonings containers according to a recipe to provide one or more seasonings to the food product.

* * * * *